US012238127B1

(12) United States Patent
Shivamoggi et al.

(10) Patent No.: US 12,238,127 B1
(45) Date of Patent: Feb. 25, 2025

(54) ANOMALOUS DATA TRANSFER DETECTION

(71) Applicant: Rapid7, Inc., Boston, MA (US)

(72) Inventors: Vasudha Shivamoggi, Cambriege, MA (US); Roy Hodgman, Cambridge, MA (US)

(73) Assignee: Rapid7, Inc., Boston, MA (US)

(*) Notice: Subject to any disclaimer, the term of this patent is extended or adjusted under 35 U.S.C. 154(b) by 530 days.

(21) Appl. No.: 17/577,449

(22) Filed: Jan. 18, 2022

(51) Int. Cl.
*H04L 9/40* (2022.01)
*G06F 7/08* (2006.01)

(52) U.S. Cl.
CPC ............ *H04L 63/1425* (2013.01); *G06F 7/08* (2013.01)

(58) Field of Classification Search
None
See application file for complete search history.

(56) References Cited

U.S. PATENT DOCUMENTS

| | | | | |
|---|---|---|---|---|
| 6,192,029 B1* | 2/2001 | Averbuch | ................ | H04W 8/04 370/230 |
| 6,728,770 B1* | 4/2004 | Bradford | ................ | H04L 43/00 718/105 |
| 7,639,714 B2* | 12/2009 | Stolfo | ...................... | G06F 21/55 726/13 |
| 8,255,532 B2* | 8/2012 | Smith-Mickelson | ....................... | H04L 63/1425 702/182 |
| 8,904,535 B2* | 12/2014 | Liu | ..................... | H04L 63/1408 726/24 |
| 9,378,361 B1* | 6/2016 | Yen | ........................ | H04L 63/14 |
| 10,142,357 B1* | 11/2018 | Tamersoy | ............. | G06N 20/00 |
| 10,482,464 B1* | 11/2019 | Dietrich | ............. | G06Q 20/4016 |
| 10,645,109 B1* | 5/2020 | Lin | ........................ | G06N 5/047 |
| 11,895,183 B2* | 2/2024 | Dekel | ................... | H04L 47/783 |
| 2005/0289219 A1* | 12/2005 | Nazzal | ................ | H04L 63/1408 709/203 |
| 2006/0195604 A1* | 8/2006 | Goodman | ............. | G06F 21/316 709/225 |
| 2007/0094725 A1* | 4/2007 | Borders | .............. | H04L 63/1408 726/13 |
| 2008/0109730 A1* | 5/2008 | Coffman | ................ | G06Q 30/02 715/733 |
| 2009/0158430 A1* | 6/2009 | Borders | ................ | G06F 21/552 726/23 |

(Continued)

*Primary Examiner* — Kambiz Zand
*Assistant Examiner* — Mahabub S Ahmed
(74) *Attorney, Agent, or Firm* — Ashwin Anand

(57) ABSTRACT

Various embodiments include systems and methods of anomalous data transfer detection. Hotspots for an asset of an organization may be determined, corresponding to period(s) of time in which outbound data from the asset satisfies a hotspot threshold determined to be indicative of high outbound data traffic activity. Based on the outbound data, a first set of days are identified as "quiet" day(s); a second set of days are identified as "active" day(s); and "quiet" hour(s) of the day, associated with "active" day(s), are identified. The "quiet" day(s) and the "quiet" hour(s) are identified as a warmspot dataset, which may be utilized to detect anomalous data transfer activity associated with the asset. Detecting the anomalous data transfer activity includes computing one or more statistics on the warmspot dataset. Responsive to detecting the anomalous data transfer activity, an alert associated with the asset may be generated.

20 Claims, 12 Drawing Sheets

(56) References Cited

U.S. PATENT DOCUMENTS

| | | | | |
|---|---|---|---|---|
| 2012/0036250 | A1* | 2/2012 | Vaswani | G01D 4/004 709/224 |
| 2012/0327779 | A1* | 12/2012 | Gell | H04L 47/6275 370/235 |
| 2013/0117847 | A1* | 5/2013 | Friedman | H04L 43/16 709/201 |
| 2015/0142629 | A1* | 5/2015 | Suplee | G06Q 20/4016 705/35 |
| 2015/0339673 | A1* | 11/2015 | Adjaoute | G06Q 20/4016 705/30 |
| 2015/0355957 | A1* | 12/2015 | Steiner | G06F 21/552 714/37 |
| 2016/0036838 | A1* | 2/2016 | Jain | H04L 63/1416 726/23 |
| 2016/0191563 | A1* | 6/2016 | Beauchesne | G06F 21/554 726/25 |
| 2016/0294569 | A1* | 10/2016 | Chen | H04M 15/66 |
| 2016/0295028 | A1* | 10/2016 | Chen | H04M 15/881 |
| 2017/0054624 | A1* | 2/2017 | Hassink | H04L 41/0622 |
| 2017/0063912 | A1* | 3/2017 | Muddu | H04L 43/045 |
| 2017/0264639 | A1* | 9/2017 | Sama | H04L 63/029 |
| 2017/0318053 | A1* | 11/2017 | Singh | H04L 63/1425 |
| 2017/0353501 | A1* | 12/2017 | Lau | H04L 63/20 |
| 2018/0146001 | A1* | 5/2018 | Chien | H04L 9/3247 |
| 2018/0212989 | A1* | 7/2018 | Mavani | H04L 63/1416 |
| 2018/0219889 | A1* | 8/2018 | Oliner | G06N 3/04 |
| 2018/0227322 | A1* | 8/2018 | Luo | H04L 63/1425 |
| 2018/0365665 | A1* | 12/2018 | Yan | G06Q 20/1085 |
| 2018/0375887 | A1* | 12/2018 | Dezent | H04L 43/08 |
| 2019/0052676 | A1* | 2/2019 | Giokas | H04W 12/08 |
| 2019/0081876 | A1* | 3/2019 | Ghare | H04L 63/1425 |
| 2019/0349403 | A1* | 11/2019 | Anderson | H04L 41/0894 |
| 2019/0387399 | A1* | 12/2019 | Weinberg | H04L 43/04 |
| 2020/0186555 | A1* | 6/2020 | LeMarquand | H04L 63/1408 |
| 2020/0267176 | A1* | 8/2020 | Asher | H04L 63/0263 |
| 2020/0358787 | A1* | 11/2020 | Barker | H04L 63/123 |
| 2020/0382538 | A1* | 12/2020 | Feezell | H04L 63/1433 |
| 2021/0194925 | A1* | 6/2021 | Xiao | H04L 63/0227 |
| 2021/0258329 | A1* | 8/2021 | Clayton | H04L 63/1416 |
| 2021/0288986 | A1* | 9/2021 | Myers | H04L 63/1441 |
| 2021/0360407 | A1* | 11/2021 | Obaidi | H04M 15/04 |
| 2022/0173988 | A1* | 6/2022 | Dam | H04L 41/046 |
| 2022/0277075 | A1* | 9/2022 | Cummings | H04L 63/1441 |
| 2022/0311789 | A1* | 9/2022 | Luk-Zilberman | H04L 63/1425 |
| 2022/0368696 | A1* | 11/2022 | Karpovsky | H04L 63/102 |
| 2022/0407875 | A1* | 12/2022 | Prudkovskiy | H04L 63/1416 |
| 2023/0136037 | A1* | 5/2023 | Sesha | H04L 67/10015 709/224 |
| 2023/0153425 | A1* | 5/2023 | Yuceer | H04L 63/1425 726/23 |
| 2023/0179616 | A1* | 6/2023 | Rahmes | G06N 3/047 726/23 |
| 2023/0254314 | A1* | 8/2023 | Gupta | H04L 63/20 726/1 |

* cited by examiner

800

```
┌─────────────────────────────────────────────────────────────┐
│ Determine hotspots for a particular asset of an organization, where │
│ the hotspots correspond to one or more periods of time in which     │
│ outbound data from the particular asset satisfies a hotspot threshold│
│ determined to be indicative of high outbound data traffic activity for│
│ the particular asset                                                │
│ 810                                                                 │
└─────────────────────────────────────────────────────────────┘
                              │
                              ▼
┌─────────────────────────────────────────────────────────────┐
│ Filter out, form the outbound data, a subset of data that does not │
│ correspond to the hotspots, where the remaining data after filtering│
│ out the subset of data corresponds to a hotspot dataset associated │
│ with the hotspots                                                  │
│ 820                                                                │
└─────────────────────────────────────────────────────────────┘
                              │
                              ▼
┌─────────────────────────────────────────────────────────────┐
│ Utilize the hotspot dataset to detect anomalous data transfer activity,│
│ where detecting the anomalous data transfer activity includes       │
│ computing one or more statistics on the hotspot dataset             │
│ 830                                                                 │
└─────────────────────────────────────────────────────────────┘
                              │
                              ▼
┌─────────────────────────────────────────────────────────────┐
│ Responsive to detecting the anomalous data transfer activity,       │
│ generate an alert associated with the particular asset              │
│ 840                                                                 │
└─────────────────────────────────────────────────────────────┘
```

FIG. 8

ANOMALOUS DATA TRANSFER DETECTION

BACKGROUND

Many companies operate private computer networks that are connected to public networks such as the Internet. While such connections allow its users to easily access resources on the public networks, they also expose the company network to potential cyberattacks. For example, company users may unwittingly download malicious content (e.g., data, files, applications, programs, etc.) onto the company network from the Internet. As another example, interactions between company users and outsiders on the public network may result in leaks of proprietary information to allow malicious actors to gain unauthorized access to the company network. Additionally, flaws or defects in the configuration (policy and/or compliance) and version (missing patches) of software could allow for the introduction of malware and/or the existence of an attack surface. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities.

Certain network activity may be indicative that a malicious actor is, for example, transferring data to or from network devices. For example, a high amount of network traffic may be considered an anomalous data transfer event and may indicate that a malicious actor has gained access to a device and is exfiltrating data therefrom. Existing techniques for detecting such anomalous data transfer activity often result in false positives. False positives not only annoy security personnel, but also distract them and divert computing resources from addressing actual malicious network activity. Accordingly, a need exists for improved systems and methods of detecting anomalous data transfer events.

SUMMARY OF EMBODIMENTS

The systems and methods described herein may be employed in various combinations and in embodiments to detect anomalous data transfers, which may be indicative of exfiltration events (in some cases). As described herein, detection of anomalous data transfers according to the present disclosure may reduce false positives relative to some alternative approaches to anomalous data transfer detection.

BRIEF DESCRIPTION OF THE DRAWINGS

FIG. 8 is a flowchart that illustrates an example of an anomalous data transfer detection process, according to some embodiments.

Figure 1:
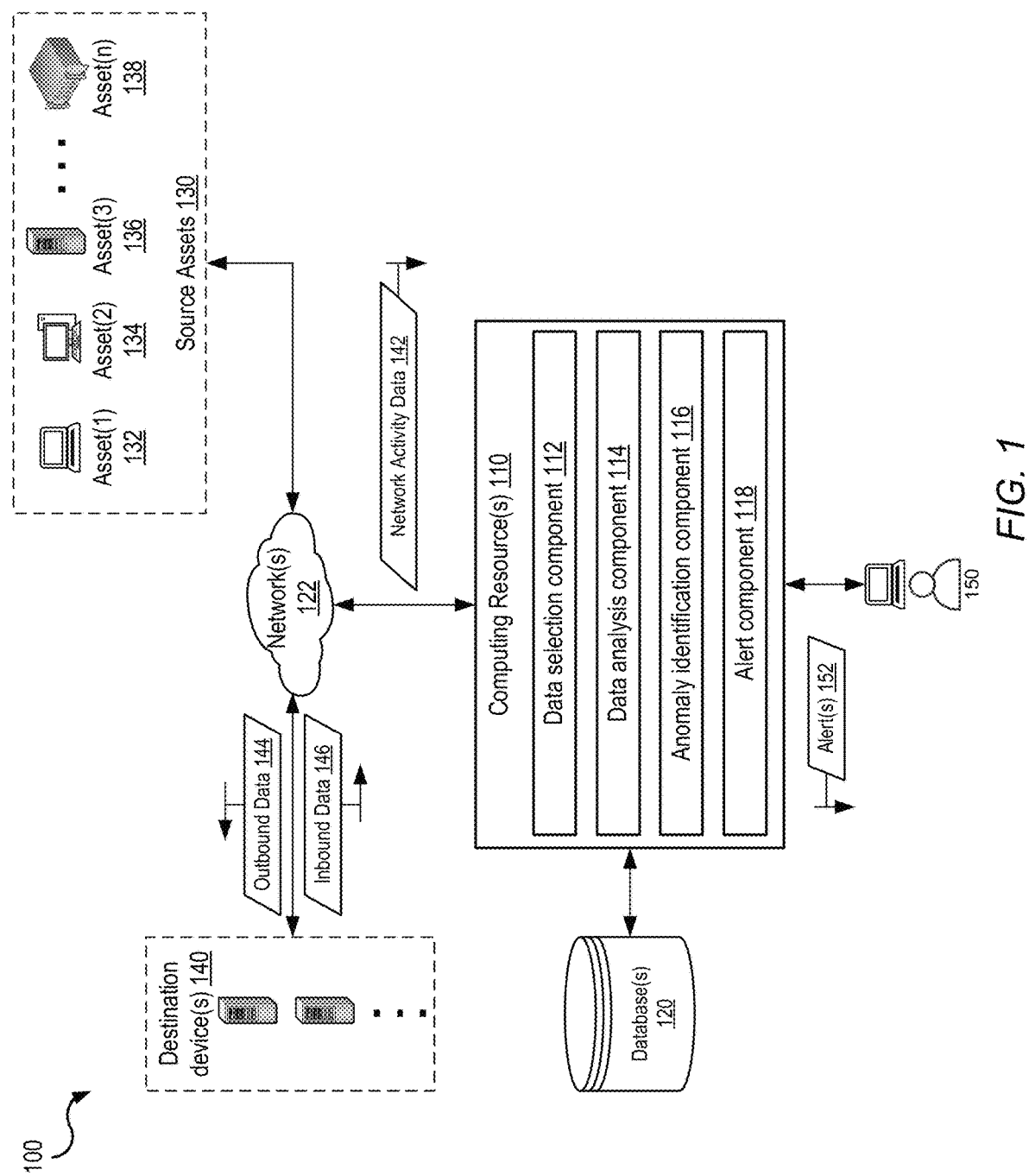
FIG. 1 is a block diagram illustrating an example system that implements anomalous data transfer detection, in accordance with some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure relates to systems and methods of monitoring network activity to detect anomalous data transfers. Anomalous outbound data transfers may be indicative of exfiltration events (or misconfigurations or accidental data transfers). As described herein, detection of anomalous data transfers according to the present disclosure may reduce false positives relative to some alternative approaches to anomalous data transfer detection. By reducing such false positives, the anomalous data transfer detection approaches according to the present disclosure may advantageously allow security personnel to focus on addressing actual anomalous network activity, rather than being distracted by false positives and diverting computing resources to examine such false positives.

One conventional anomaly detection approach to data exfiltration involves baselining historical traffic and flagging any outliers above those baselines. In some cases, traffic may vary significantly by asset and by time of day or time of week. To reduce false positives from high-volume areas and to improve visibility into low-volume areas, one previous approach involved utilizing separate baselines for each asset, hour of day, and day of week. Such an approach may produce satisfactory results for assets that have a regular, working-day behavior. However, for assets with a more intermittent or irregular traffic pattern, such an approach may provide unsatisfactory results. To illustrate, for such assets with more intermittent or irregular traffic patterns, grouping by hour of day and day of week may be too restrictive. With such an approach, many alerts may be associated with outliers for the time in question but may be comparable to other events at other hours or days of week in the particular asset's history. Such alerts are likely not of interest to a user (e.g., a security analyst) and may actually increase the number of false positives.

One conventional anomaly detection approach to data exfiltration may assume a normal distribution. For variants such as a log-normal distribution, a logarithmic transformation of an input variable may be performed in order to approximate a normal distribution. However, distributions of input variables may still be bimodal even after such a log-normal transformation. As such, the present disclosure addresses this issue in a way that generalizes across many different asset behaviors.

In contrast to previous approaches, the systems and methods of the present disclosure may separate periods of relatively "high" activity (also referred to herein as "active" periods) from periods of relatively "low" activity (also referred to herein as "inactive" periods) in an asset's history. By utilizing such an approach, anomaly detection may be performed separately on the active periods and the inactive periods. The present disclosure may provide a comprehensive method that generates satisfactory results across assets that may have significantly different traffic levels, without manual tuning. As described herein, the systems and methods of the present disclosure may significantly reduce false positives.

The distribution of outgoing bytes for a typical asset is bimodal. That is, most of the outgoing connections from such a typical asset may correspond to a relatively small number of bytes, but for such a typical asset there may be a non-trivial number of outgoing connections with a relatively large number of bytes. A higher peak (or peaks) associated with such outgoing connections with the relatively large number of bytes may be responsible for false positives. For these connections, each outgoing connection appears to be relatively high compared to a median (a "lower" peak), even though each of these outgoing connections may occur frequently enough that a security analyst would typically not identify them as worthy of investigation. Accordingly, this problem of outgoing connections appearing relatively high compared to the median may represent a challenge for any automated anomaly detection method.

As described herein, the present disclosure addresses this problem by filtering out the lower peak and using the higher peak (also referred to herein as a "hotspot") for computing baselines. As such, in the present disclosure, an outlier is flagged when it is large compared to the higher peak and thus corresponds to a "true" anomaly for the distribution. To address the technical challenge of determining a programmatic way to set a threshold for filtering, the present disclosure utilizes an approach that examines the properties of each individual asset's distribution. Utilizing such an approach may avoid setting a hard-coded threshold that may provide satisfactory results for some assets but unsatisfactory results for other assets.

As described further herein, such an approach may involve multiple stages, according to various implementations. As an illustrative, non-limiting example, during a first stage, outgoing network connections may be grouped by source asset and date/hour. That is, for each hour in each day, the outgoing source bytes may be aggregated to calculate a total of outgoing source bytes for each individual hour. A logarithmic transformation (e.g., logarithm base 10) may be performed to determine logarithmic values for each of the calculated outgoing source byte totals.

During a second stage, for each asset, the hours may be sorted (in descending order) according to the logarithmic values for the calculated outgoing source byte totals, according to various implementations. That is, considering each of the hours that fall within a sliding "window" of time for a particular calculation (e.g., a sliding "window" corresponding to a 30 day period of historical outgoing data transfers, among other possibilities), the logarithmic values for the calculated outgoing source byte totals may be sorted such that the largest values are at the "top" of a sorted list and the smallest values are at the "bottom" of the sorted list.

During a third stage, starting from the "top" of the sorted list, a median value for the logarithmic values for the calculated outgoing source byte totals may be computed for all "higher" rows in the sorted list, according to various implementations. For example, for the top/first row in the sorted list, the median value for all higher rows corresponds to the value in the top/first row. For the next/second row in the sorted list, the median value for all higher rows corresponds to an average of the value in the top/first row and the value in the next/second row. In general, the computed median value of "higher" rows corresponds to the value halfway "up" the sorted list. That is, during the third stage, each of the median values is calculated by considering the value in the current row and the values in any rows "above" the current row, representing the more highly trafficked time periods.

During a fourth stage, according to various implementations, a derivative of the median of "higher" rows may be calculated. That is, for each row in the sorted list, such a computation may include determining a difference between a median value of the row "above" the current row and the median value of the current row. Subsequently, the computation may include dividing by a difference between the logarithmic value for the calculated outgoing source byte totals of the row "above" the current row and the logarithmic value for the calculated outgoing source byte totals of the current row. The derivative of the median determined during the fourth stage may be utilized to identify relatively rapid changes in the median values.

During a fifth stage, according to various implementations, all "local" maxima in the derivative may be identified. The local maxima may be filtered to identify those above a threshold in the value of the derivative, and a local maximum with the greatest logarithmic value for the calculated outgoing source byte totals may be selected. This local maximum may be utilized as a threshold for identifying "hotspots" in outgoing network traffic. That is, the fifth stage includes: finding the local maxima in the derivative; filtering for those above a certain threshold for the median derivative (which may be preset and consistent across all assets, according to some implementations); and selecting a local maximum (that is greater than the threshold) with the greatest logarithmic value for the calculated outgoing source byte totals. Depending on the particular preset value for the median derivative threshold (e.g., a relatively large value or a relatively small value), a different local maximum may be selected, according to some implementations.

During a sixth stage, according to various implementations, "hotspots" may be defined as all the hours in which the logarithmic values for the calculated outgoing source byte totals exceed the calculated threshold for identifying "hotspots" in outgoing network traffic (as determined during the fifth stage).

During a seventh stage, according to various implementations, the "hotspots" identified during the sixth stage may be utilized to compute various statistics that define a baseline. To illustrate, the computed statistics may include a median and interquartile range (IQR), and such computed statistics may be utilized to identify anomalous data transfer events. In anomaly detection systems, anomalies may be determined using these computed statistics. For example, any outgoing data transfer values may be considered anomalous when such values exceed a particular computed value, such as outgoing data transfer values exceeding a value computed according to the following formula: (median+2*IQR). That is, an outgoing data transfer value exceeding the value computed according to the formula may be considered an anomalous data transfer event, which may be indicative of a data exfiltration event (or a misconfiguration or an accidental data transfer) and may trigger an alert. In some implementations, a post-processing "de-noising" stage may be utilized in which alerts triggered during periods of relatively large inbound data transfers may be filtered. As described herein, identifying anomalous data transfer events in such a manner may be advantageous for security personnel by potentially reducing false positives and associated "alert fatigue", among numerous other advantages.

Additionally, the present disclosure contemplates a corollary for identifying another "true" anomaly for the distribution. In this corollary, the previously described "hotspot" approach of the present disclosure may be adjusted to account for time periods such as nights and weekends for assets that may typically be active only during working hours on weekdays. As an illustrative, non-limiting example, for an asset corresponding to an employee laptop, the computed "hotspots" may fall within business hours on weekdays. Outside of business hours (e.g., on nights and on weekends), outbound data traffic may be relatively sparse and may have a significantly lower median value. In this example, an alert may not be triggered for an outbound data transfer that is significantly higher than the lower median value for such periods of relatively sparse activity because the outbound data transfer does not exceed the computed value for detecting anomalies, as previously described with respect to "hotspot" periods. However, as the outbound data transfer is significantly higher than the lower median value for such periods of relatively sparse activity, it may be appropriate to trigger an alert in such cases. As used herein, the term "warmspots" refers to active periods in "cold" windows that have very few "hotspots." Accordingly, the present disclosure contemplates an approach to ensure that "cold windows" between "hotspots" are satisfactorily monitored.

As described further herein, such an approach may involve multiple stages, according to some implementations. As an illustrative, non-limiting example, during a first stage, "hotspots" may be computed for a particular asset (as previously described herein), according to some implementations. During a second stage, according to some implementations, one or more relatively "quiet" days of the week may be identified. That is, a particular day (or days) of the week having a relatively small percentage of "hotspot" activity (or no "hotspot" activity) may be considered a "quiet" day compared to an "active" day with a relatively large percentage of "hotspot" activity.

During a third stage, according to some implementations, if there one or more "quiet" days of the week are identified, such day(s) may be set aside. Afterwards, "active" days of the week may be re-examined to identify "quiet" hours on such days. To illustrate, a particular hour (or hours) of a particular "active" day having a relatively small amount of outbound data (or no outbound data) may be considered a "quiet" hour compared to an "active" hour of the particular "active" day with a relatively large amount of outbound data. As an illustrative, non-limiting example, an "active" day may correspond to a business day (e.g., a weekday), and "active" hours of a business day may approximately correspond to business hours (e.g., for a typical employee asset). Accordingly, in this example, "quiet" hours of such an "active" day may approximately correspond to non-business hours (e.g., for a typical employee asset).

During a fourth stage, according to some implementations, "cold" windows may be defined as the combined set of one or more "quiet" days of week and one or more "quiet" hours of day. It should be noted that not all assets have such "cold" windows. For example, some assets may be active sporadically without a particular identifiable pattern or may be active consistently. In this example, further examination of such assets without "cold" windows is not performed.

During a fifth stage, for those assets with "cold" windows, the aforementioned "hotspot" analysis may be performed on data from the "cold" windows, according to some implementations. As used herein, the results of such analysis correspond to "warmspots" that become the baseline for the "cold" windows. Typically, the baseline for the "cold" windows is lower than the baseline for "hotspots" as would be expected for comparing weekend/after-hours activity to working day activity.

During a sixth stage, for those assets with "cold" windows, when new network activity data (including outbound data activity) is received, such network activity may be examined to determine whether the activity occurs during a particular "cold" window, according to some implementations. If the activity occurs during a particular "cold" window, "warmspots" may be utilized for anomaly detection. If the activity does not occur during such a window, "hotspots" may be utilized for anomaly detection.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, a block diagram illustrates various components of an example system 100 that implements anomalous data transfer detection, in accordance with some embodiments. The system 100 of FIG. 1 may be configured to detect anomalous outbound data transfers may be indicative of exfiltration events (or misconfigurations or accidental data transfers). Advantageously, the system 100 of FIG. 1 may reduce false positives relative to some alternative approaches to anomalous data transfer detection. By reducing such false positives, the system 100 of FIG. 1 may advantageously allow security personnel to focus on addressing actual anomalous network activity, rather than being distracted by false positives (and associated "alert fatigue") and diverting computing resources to examine such false positives.

Figure 11:
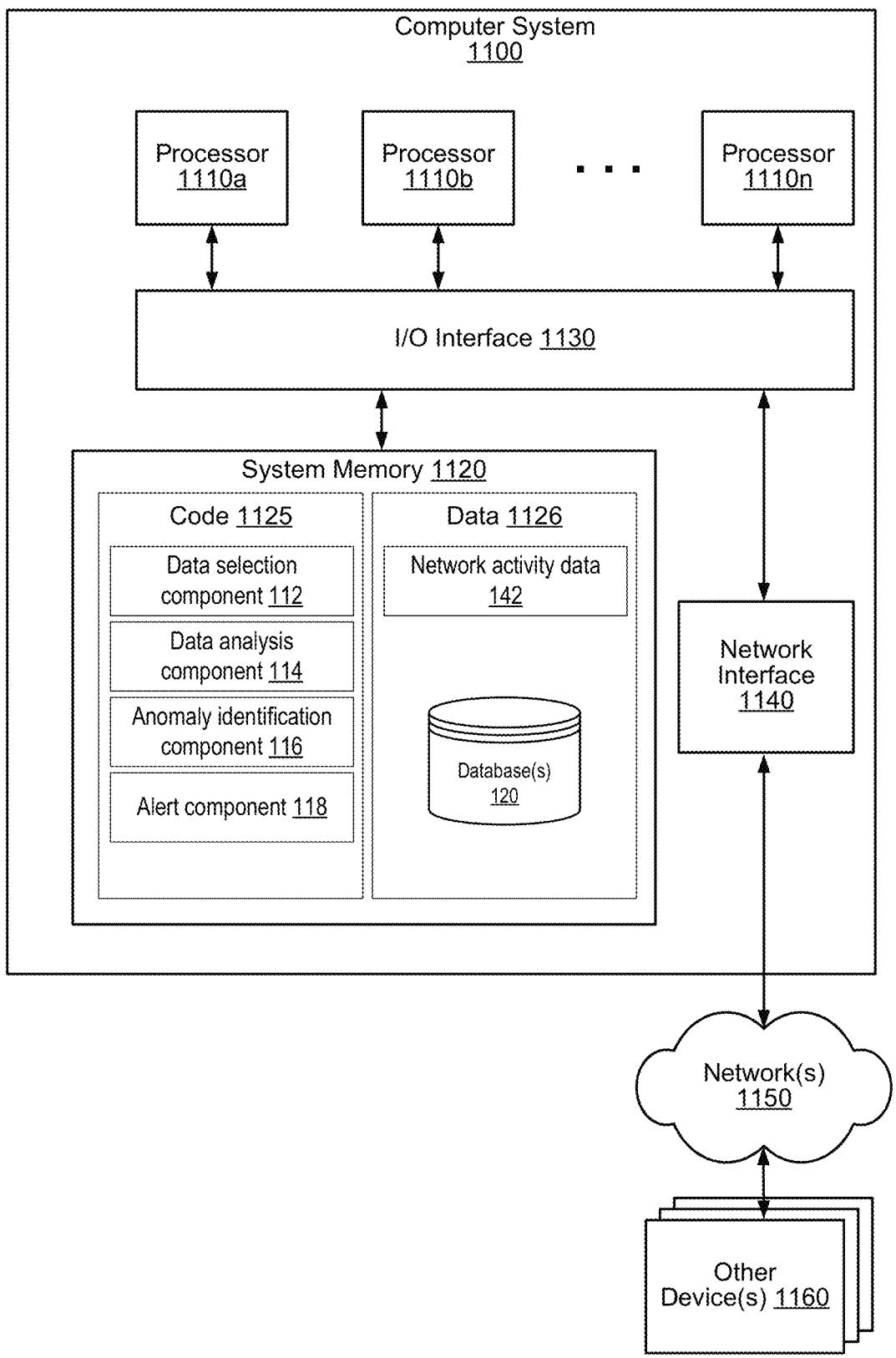
FIG. 11 is a block diagram illustrating an example computer system that may be used to implement one or more portions of a system that implements anomalous data transfer detection, according to some embodiments.

FIG. 1 depicts one or more computing resources 110, which may include one or more hardware processors with associated memory (not shown, see e.g. FIG. 11). The computing resource(s) 110 may include one or more components that are configured to implement anomalous data transfer detection, as described herein. In the embodiment depicted in FIG. 1, the computing resource(s) 110 include a data selection component 112, a data analysis component 114, an anomaly identification component 116, and an alert component 118.

FIG. 1 further illustrates that the system 100 may include one or more databases 120 that may store baseline data such as data regarding the expected or otherwise normal behavior of each individual asset of a plurality of source assets 130 (associated with an organization) on one or more networks 122. This data may be leveraged to help determine whether outgoing traffic is atypical or is otherwise anomalous. For example, the database(s) 120 may store data regarding source and destination addresses of all connections originating on the network(s) 122, as well as their size, duration, and time stamp of such connections. At the other end, each candidate for a possible exfiltration event may include an asset ID (or a source IP address, in alternative embodiments) and how much data it sent out, as well as data about one or more destination devices 140 to aid a user 150 in evaluating the event, according to various embodiments.

In the particular embodiment depicted in FIG. 1, the source assets 130 (associated with the organization) include a first asset 132 (e.g., a laptop computer), a second asset 134 (e.g., a desktop computer), a third asset 136 (e.g., a server), up to an nth asset 138 (e.g., a rack-mounted server). It will be appreciated that, in alternative embodiments, the source assets 130 may include alternative numbers and/or types of assets. The one or more destination devices 140 may correspond to computing devices that are not associated with the organization (e.g., third-party web servers, etc.). In the context of the present application, the term "source" refers to a device that sends out data (and may therefore be at risk of being a victim of an exfiltration event).

The computing resource(s) 110 may be configured to receive network activity data 142 associated with communications between the individual source assets 130 and the destination device(s) 140 over the network(s) 122. For example, the network activity data 142 may include at least outbound data 144 associated with outbound data transfers from the individual source assets 130 to the destination device(s) 140 over the network(s) 122. In some cases, as shown in the example depicted in FIG. 1, the network activity data 142 may further include inbound data 146 associated with inbound data transfers from the destination device(s) 140 to the individual source assets 130 over the network(s) 122.

The data selection component 112 may be configured to select a subset of the received network activity data 142 for analysis. For example, the data selection module 112 may select outgoing data from a particular asset of the source assets 130 (e.g., as designated by a particular asset identifier (ID) or by a particular IP address, among other possibilities), according to some embodiments. To illustrate, the first asset 132 may be associated with a first asset ID, the second asset 134 may be associated with a second asset ID, third asset 136 may be associated with a third asset ID, and the nth asset 138 may be associated with an nth asset ID. Accordingly, in selecting a subset of the received network activity data 142, the data selection component 112 may be configured to select outgoing data from one of: the first asset ID (for analysis of the first asset 132); the second asset ID (for analysis of the second asset 134); the third asset ID (for analysis of the third asset 136); or the nth asset ID (for analysis of the nth asset 138). It will be appreciated that tracking devices based on their asset ID and/or their IP address are illustrative, non-limiting examples of techniques of for tracking, and alternative tracking techniques may be utilized in alternative embodiments. Further details regarding various sub-components of the data selection component 112 of FIG. 1 are illustrated and described further herein with respect to FIG. 3.

The data analysis component 114 depicted in the example of FIG. 1 may be configured to separate periods of relatively "high" activity (also referred to herein as "active" periods) from periods of relatively "low" activity (also referred to herein as "inactive" periods) in an asset's history. Further details regarding various sub-components of the data analysis component 114 of FIG. 1 are illustrated and described further herein with respect to FIG. 4.

By utilizing such an approach, the anomaly detection component 116 depicted in the example of FIG. 1 may be configured to identify anomalies by separately performing various anomaly detection approaches on the active periods and the inactive periods, as described herein. The various components of the system 100 depicted in the example of FIG. 1 may be configured to provide a comprehensive method that generates satisfactory results across assets that may have significantly different traffic levels, without manual tuning. Additionally, as described further herein, the system 100 of FIG. 1 may significantly reduce false positives. By reducing such false positives, the system 100 of FIG. 1 may advantageously allow security personnel to focus on addressing actual anomalous network activity, rather than being distracted by false positives and diverting computing resources to examine such false positives. Further details regarding various sub-components of the anomaly identification component 116 of FIG. 1 are illustrated and described further herein with respect to FIG. 5.

The alert component 118 depicted in the example of FIG. 1 may be configured to trigger an alert responsive to the anomaly identification component 116 determining that an anomalous data transfer event has been detected. Further details regarding various sub-components of the alert component 118 of FIG. 1 are illustrated and described further herein with respect to FIG. 6.

Thus, FIG. 1 illustrates that the system 100 may be utilized to detect anomalous data transfers, which may be indicative of exfiltration events (in some cases). Advantageously, the system 100 of FIG. 1 may reduce false positives relative to some alternative approaches to anomalous data transfer detection. By reducing such false positives, the system 100 of FIG. 1 may advantageously allow security personnel to focus on addressing actual anomalous network activity, rather than being distracted by false positives (and associated "alert fatigue") and diverting computing resources to examine such false positives.

Figure 2A:
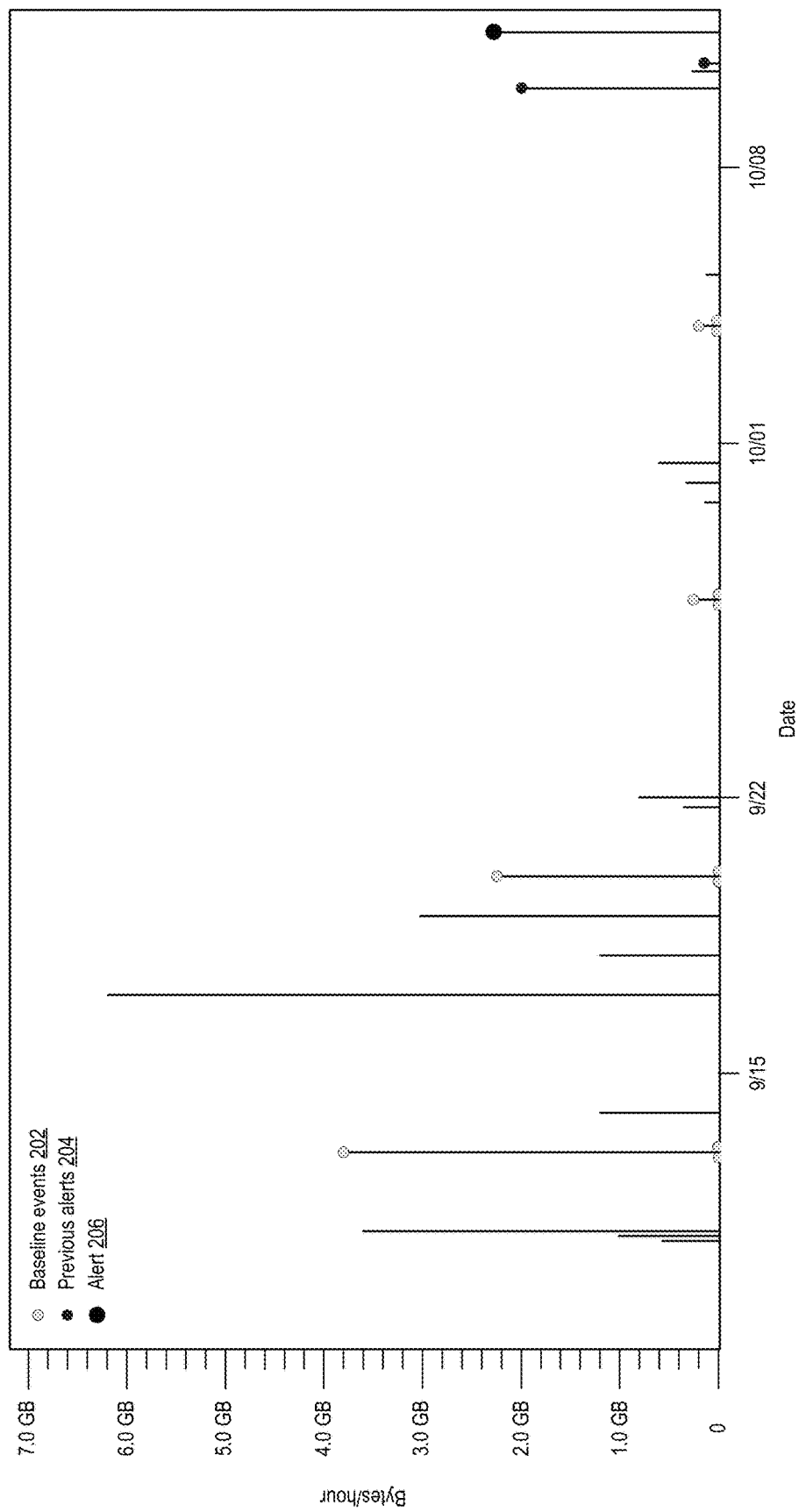
FIG. 2A is a diagram illustrating an example of an alternative implementation for anomalous data transfer detection.

FIG. 2A is a diagram 200 illustrating an example of an alternative implementation for anomalous data transfer detection.

FIG. 2A illustrates an anomaly detection approach to data exfiltration that involves baselining historical traffic and flagging any outliers above those baselines. In some cases, traffic may vary significantly by asset and by time of day or time of week. To reduce false positives from high-volume areas and to improve visibility into low-volume areas, one previous approach involved utilizing separate baselines for each asset, hour of day, and day of week. Such an approach may produce satisfactory results for assets that have a regular, working-day behavior. However, for assets with a more intermittent or irregular traffic pattern, such an approach may provide unsatisfactory results. To illustrate, for such assets with more intermittent or irregular traffic patterns, grouping by hour of day and day of week may be too restrictive. With such an approach, many alerts may be associated with outliers for the time in question but may be comparable to other events at other hours or days of week in the particular asset's history. Such alerts are likely not of interest to a user (e.g., a security analyst) and may actually increase the number of false positives.

FIG. 2A depicts an example of such an asset with a more intermittent or irregular traffic pattern. Referring to FIG. 2A, the points that corresponded to the same hour of day and same day of week are identified as baseline events 202 in the diagram 200. FIG. 2A illustrates that, by using those baseline events 202 (small gray-shaded dots), the approach resulted in generation of two previous alerts 204 (small black-shaded dots) and one alert 206 (large black-shaded dot). That is, by using the small gray-shaded dots as the baseline events 202, the number of source bytes was mathematically high and triggered the alert 206. However, as illustrated in the diagram 200 of FIG. 2A, compared to the small gray-shaded dots, it is readily apparent that there are other points in the history of the asset having a number of source bytes comparable to or higher than a number of source bytes associated with the alert 206. Accordingly, security personnel would likely interpret the alert 206 as a false positive. Thus, the diagram 200 in FIG. 2A illustrates that for assets that do not have a highly periodic behavior, such false positives may result from using only historical data over a recent time period (e.g., one week of prior data, two weeks of prior data, etc.).

One conventional anomaly detection approach to data exfiltration may assume a normal distribution. For variants such as a log-normal distribution, a logarithmic transformation of an input variable may be performed in order to approximate a normal distribution. However, distributions of input variables may still be bimodal even after such a log-normal transformation. As such, the present disclosure addresses this issue in a way that generalizes across many different asset behaviors.

Figure 2B:
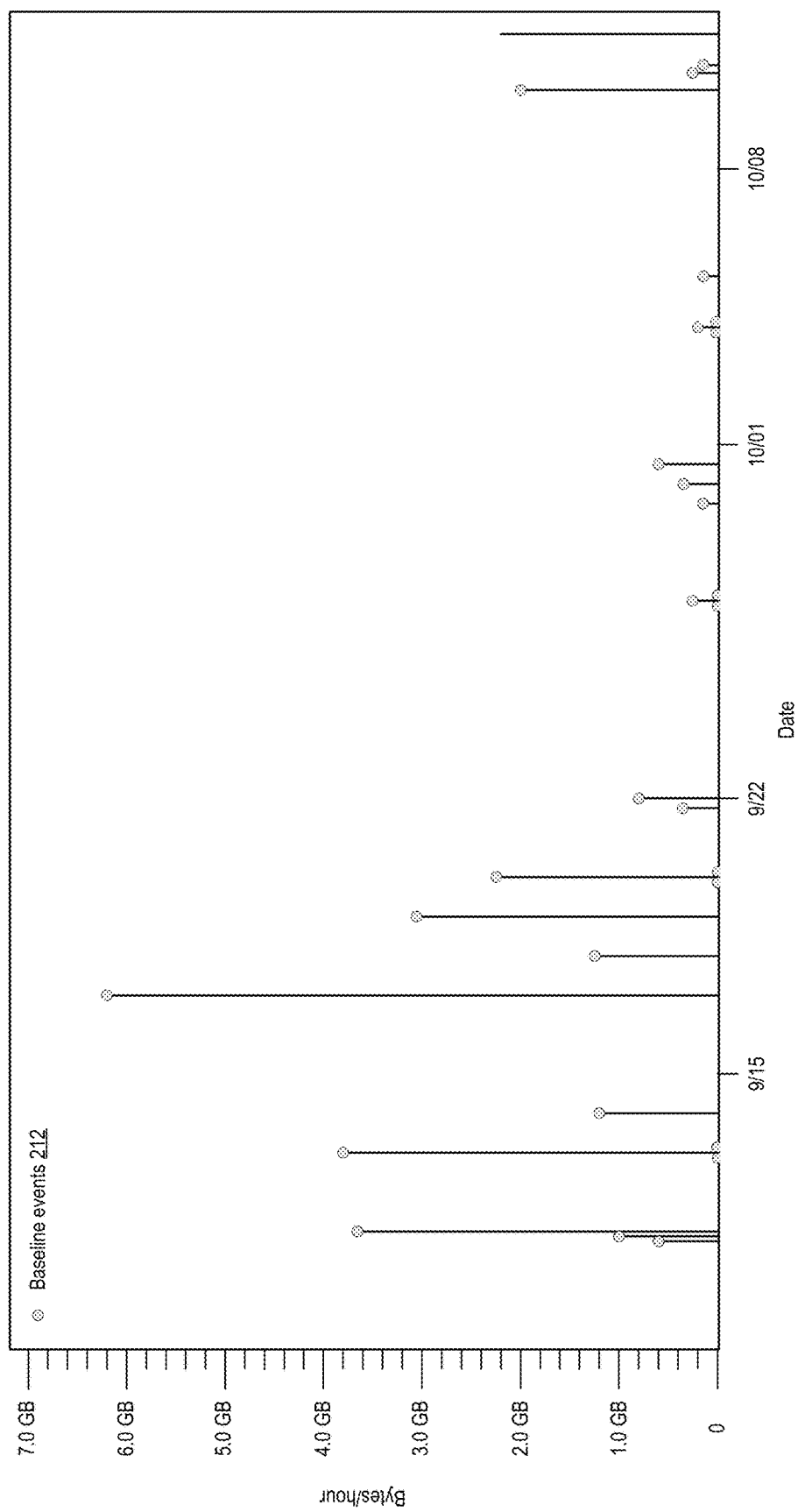
FIG. 2B is a diagram illustrating an example of an implementation for anomalous data transfer detection, in accordance with some embodiments.

FIG. 2B is a diagram 210 illustrating an example of an implementation for anomalous data transfer detection, in accordance with some embodiments.

In contrast to previous approaches such as the example approach depicted in FIG. 2A, the systems and methods of the present disclosure may separate periods of relatively "high" activity (also referred to herein as "active" periods) from periods of relatively "low" activity (also referred to herein as "inactive" periods) in an asset's history. By utilizing such an approach, anomaly detection may be performed separately on the active periods and the inactive periods. The present disclosure may provide a single method that generates satisfactory results across assets that may have significantly different traffic levels, without manual tuning. As described herein, the systems and methods of the present disclosure may significantly reduce false positives.

The diagram 210 depicted in FIG. 2B illustrates that, by utilizing the anomalous data transfer approaches described in the present disclosure, the alert 206 depicted in FIG. 2A that represented a false positive is not generated. Instead, FIG. 2B illustrates that each of the previous data points depicted in the diagram of FIG. 2A correspond to baseline events 212 in the diagram 210 of FIG. 2B. As such, the previous "peak" that generated the alert 206 in FIG. 2A is no longer representative of an anomalous data transfer in comparison to the baseline events 212, several of which are significantly higher than the data point that generated the alert 206 in FIG. 2A that security personnel would regard as a false positive.

Thus, FIG. 2A illustrates one implementation related to anomalous data transfer detection that may result in alerts being generated that are false positives. By contrast, FIG. 2B illustrates that utilizing the systems and methods of the present disclosure may reduce the number of such alerts that are false positives.

Figure 3:
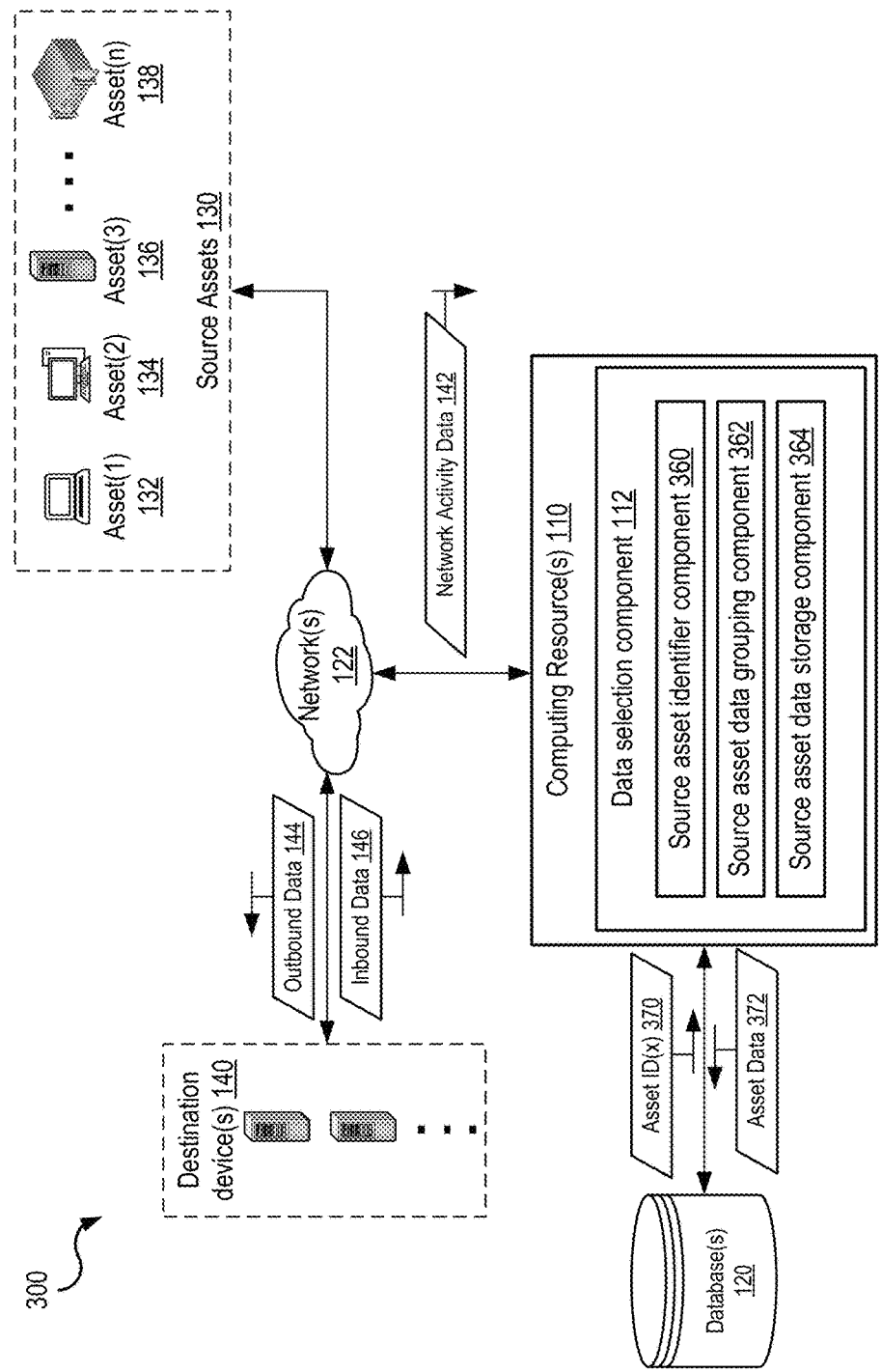
FIG. 3 is a block diagram illustrating select components of the example system depicted in FIG. 1 that implements anomalous data transfer detection, in accordance with some embodiments.

FIG. 3 is a block diagram 300 illustrating select components of the example system 100 depicted in FIG. 1 that implements anomalous data transfer detection, in accordance with some embodiments. In the particular embodiment depicted in FIG. 3, various example sub-components of the data selection component 112 of FIG. 1 are illustrated and include: a source asset identifier component 360; a source asset data grouping component 362; and a source asset data storage component 364. It will be appreciated that the example depicted in FIG. 3 is for illustrative purposes only and that the data selection component 112 may contain an alternative number and/or arrangement of sub-components.

According to various embodiments, the source asset identifier component 360 may be configured to retrieve an asset identifier 370 for a particular source asset of the set of source assets 130 from the database(s) 120. In FIG. 3, the asset identifier 370 is identified as "Asset ID(x)" to represent that the particular asset ID retrieved from the database(s) 120 may correspond to any one of: the first asset 132; the second asset 134; the third asset 136; or the nth asset 138.

According to various embodiments, the source asset data grouping component 362 may be configured to utilize the asset identifier 370 from the source asset identifier component 360 to analyze the network activity data 142 in order to group outgoing network connections by source asset and date/hour. That is, for each hour in each day, the outgoing source bytes may be aggregated to calculate a total of outgoing source bytes for each individual hour. A logarithmic transformation (e.g., logarithm base 10) may be performed to determine logarithmic values for each of the calculated outgoing source byte totals.

To illustrate, when the asset identifier 370 corresponds to a first asset ID (or a first IP address, among other alternatives) associated with the first asset 132, the source asset data grouping component 362 may be configured to analyze the network activity data 142 in order to group outgoing network connections from the first asset 132 by date/hour. In a similar manner, when the asset identifier 370 corresponds to another asset in the set of source assets 130, the data grouping component 362 may be configured to analyze the network activity data 142 in order to group outgoing network connections from the second asset 134 by date/hour, from the third asset 136 by date/hour, or from the nth asset 138 by date/hour. Thus, the source asset data grouping component 362 may utilize the asset identifier 370 to analyze the network activity data 142 in order to determine a particular portion of the outbound data 144 that originates from a particular asset of the set of source assets 130 and to group the particular portion of the outbound data 144 by date/hour.

According to various embodiments, the source asset data storage component 364 may be configured to store asset data 372 associated with a particular asset in the database(s) 120. According to some embodiments, the asset data 372 may correspond to at least a portion of the data generated by the source asset data grouping component 362. To illustrate, when the particular asset corresponds to the first asset 132, the asset data 372 may correspond to at least a portion of the outbound data 144 that originates from the first asset 132 and that is grouped by date/hour. When the particular asset corresponds to the second asset 134, the asset data 372 may correspond to at least a portion of the outbound data 144 that originates from the second asset 134 and that is grouped by date/hour. When the particular asset corresponds to the third asset 136, the asset data 372 may correspond to at least a portion of the outbound data 144 that originates from the third asset 136 and that is grouped by date/hour. When the particular asset corresponds to the nth asset 138, the asset data 372 may correspond to at least a portion of the outbound data 144 that originates from the nth asset 138 and that is grouped by date/hour.

Thus, FIG. 3 illustrates various example sub-components of the data selection component 112 of FIG. 1. According to various embodiments, the source asset identifier component 360 of the data selection component 112 may retrieve the asset identifier 370 for a particular source asset. The source asset data grouping component 362 of the data selection component 112 may utilize the asset identifier 370 to analyze the network activity data 142 in order to group outgoing network connections by source asset and date/hour. The source asset data storage component 364 of the data selection component 112 may store the asset data 372 associated with a particular asset in the database(s) 120.

Figure 4:
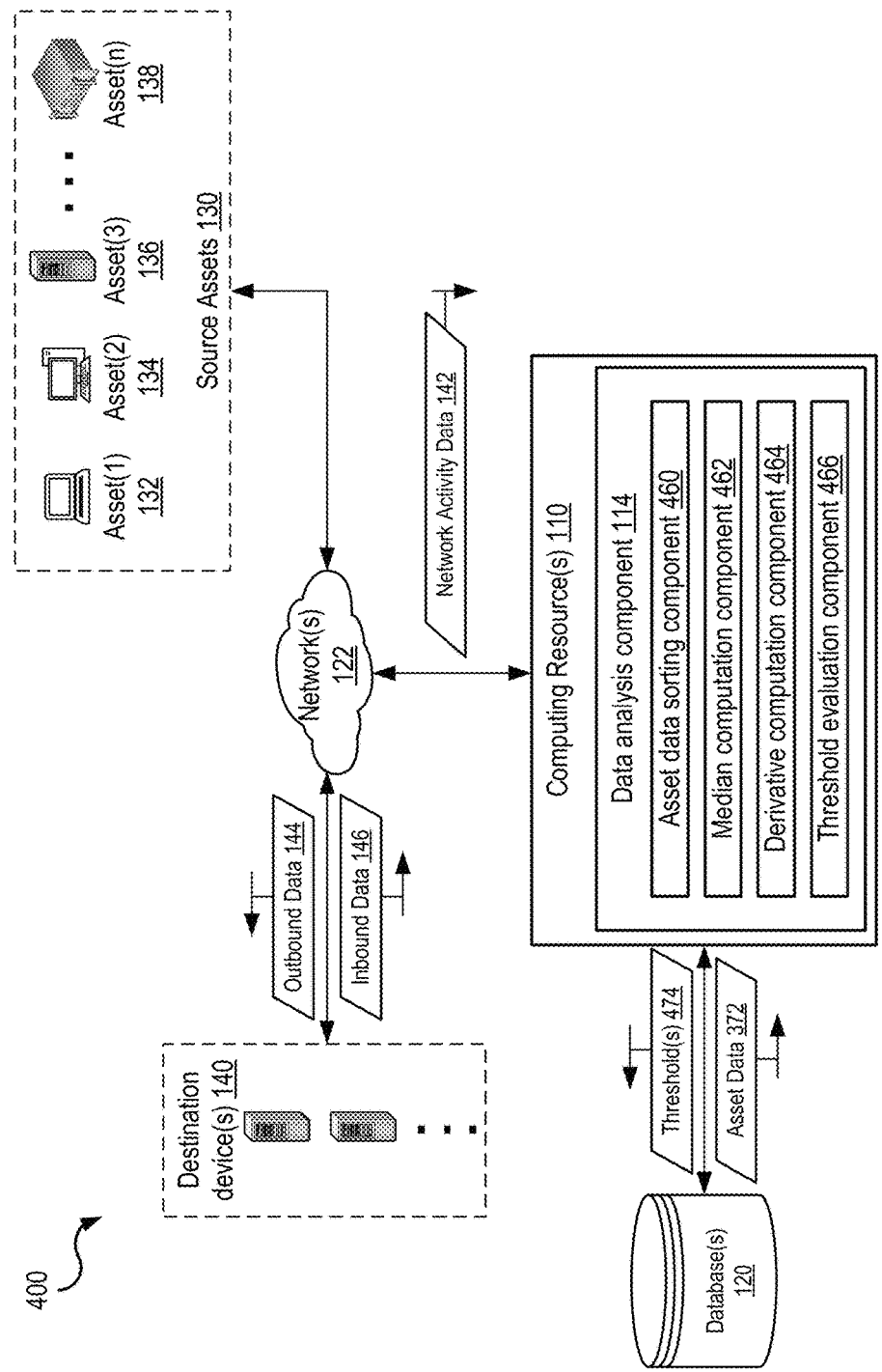
FIG. 4 is a block diagram illustrating select components of the example system depicted in FIG. 1 that implements anomalous data transfer detection, in accordance with some embodiments.

FIG. 4 is a block diagram 400 illustrating select components of the example system 100 depicted in FIG. 1 that implements anomalous data transfer detection, in accordance with some embodiments. In the particular embodiment depicted in FIG. 4, various example sub-components of the data analysis component 114 of FIG. 1 are illustrated and include: an asset data sorting component 460; a median computation component 462; a derivative computation component 464; and a threshold evaluation component 466. It will be appreciated that the example depicted in FIG. 4 is for illustrative purposes only and that the data analysis component 114 may contain an alternative number and/or arrangement of sub-components.

According to various embodiments, the asset data sorting component 460 may be configured to receive the asset data 372 (associated with a particular asset) from the database(s) 120 and to sort hours by source bytes, in descending order. For each asset, the hours may be sorted (in descending order) according to the logarithmic values for the calculated outgoing source byte totals, according to various implementations. That is, considering each of the hours that fall within a sliding "window" of time for a particular calculation (e.g., a sliding "window" corresponding to a 30 day period of historical outgoing data transfers, among other possibilities), the logarithmic values for the calculated outgoing source byte totals may be sorted such that the largest values are at the "top" of a sorted list and the smallest values are at the "bottom" of the sorted list.

As an example, as described herein with respect to FIG. 3, when the particular asset corresponds to the first asset 132, the asset data 372 may correspond to at least a portion of the outbound data 144 that originates from the first asset 132 and that is grouped by date/hour. In this case, the asset data sorting component 460 of FIG. 4 may receive the asset data 372 associated with the first asset 132 (grouped by date/hour) and may sort hours by source bytes, in descending order. As another example, when the particular asset corresponds to the second asset 134, the asset data 372 may correspond to at least a portion of the outbound data 144 that originates from the second asset 134 and that is grouped by date/hour. In this case, the asset data sorting component 460 may receive the asset data 372 associated with the second asset 134 (grouped by date/hour) and may sort hours by source bytes, in descending order. As yet another example, when the particular asset corresponds to the third asset 136, the asset data 372 may correspond to at least a portion of the outbound data 144 that originates from the third asset 136 and that is grouped by date/hour. In this case, the asset data sorting component 460 may receive the asset data 372 associated with the third asset 136 (grouped by date/hour) and may sort hours by source bytes, in descending order. As a further example, when the particular asset corresponds to the nth asset 138, the asset data 372 may correspond to at least a portion of the outbound data 144 that originates from the nth asset 138 and that is grouped by date/hour. In this case, the asset data sorting component 460 may receive the asset data 372 associated with the nth asset 138 (grouped by date/hour) and may sort hours by source bytes, in descending order.

According to various embodiments, the median computation component 462 may be configured to compute a median value for the logarithmic values for the calculated outgoing source byte totals. According to some embodiments, the median computation component 462 may be configured to start from the "top" of the sorted list and compute the median value for all "higher" rows in the sorted list. For example, for the top/first row in the sorted list, the median computation component 462 may determine that the median value for all higher rows corresponds to the value in the top/first row. For the next/second row in the sorted list, the median computation component 462 may determine that the median value for all higher rows corresponds to an average of the value in the top/first row and the value in the next/second row. In general, the median value of "higher" rows computed by the median computation component 462 corresponds to the value halfway "up" the sorted list. That is, the median computation component 462 calculates each of the median values by considering the value in the current row and the values in any rows "above" the current row, representing the more highly trafficked time periods.

According to various embodiments, the derivative computation component 464 may be configured to calculate a derivative of the median of "higher" rows. That is, for each row in the sorted list, the derivative computation component 464 may calculate the derivative by determining a difference between a median value of the row "above" the current row and the median value of the current row. Subsequently, the derivative computation component 464 may divide by a difference between the logarithmic value for the calculated outgoing source byte totals of the row "above" the current row and the logarithmic value for the calculated outgoing source byte totals of the current row. The derivative of the median determined by the derivative computation component 464 may be utilized to identify relatively rapid changes in the median values.

According to various embodiments, the threshold evaluation component 466 may be configured to: identify all "local" maxima in the derivative; filter local maxima to identify those above a threshold in the value of the derivative; and select a local maximum with the greatest logarithmic value for the calculated outgoing source byte totals. This local maximum may be utilized as a threshold for identifying "hotspots" in outgoing network traffic for a particular asset. FIG. 4 illustrates that the threshold evaluation component 466 may be configured to store one or more thresholds 474 in the database(s) 120. Each individual threshold of the one or more thresholds 474 may correspond to an individual threshold for identifying "hotspots" in outgoing network traffic for an individual asset of the set of source assets 130. To illustrate, for the first asset 132, the threshold evaluation component 466 may be configured to determine a first threshold for identifying "hotspots" in outgoing network traffic for the first asset 132 and may store the first threshold as one of the threshold(s) 474 in the database(s) 120. For the second asset 134, the threshold evaluation component 466 may be configured to determine a second threshold for identifying "hotspots" in outgoing network traffic for the second asset 134 and may store the second threshold as one of the threshold(s) 474 in the database(s) 120. For the third asset 136, the threshold evaluation component 466 may be configured to determine a third threshold for identifying "hotspots" in outgoing network traffic for the third asset 136 and may store the third threshold as one of the threshold(s) 474 in the database(s) 120. For the nth asset 138, the threshold evaluation component 466 may be configured to determine an nth threshold for identifying "hotspots" in outgoing network traffic for the nth asset 138 and may store the nth threshold as one of the threshold(s) 474 in the database(s) 120.

Thus, the threshold evaluation component 466 may be configured to: find the local maxima in the derivative; filter for those above a certain threshold for the median derivative (which may be preset and consistent across all assets, according to some implementations); and select a local maximum (that is greater than the threshold) with the greatest logarithmic value for the calculated outgoing source byte totals. Depending on the particular preset value for the median derivative threshold (e.g., a relatively large value or a relatively small value), a different local maximum may be selected, according to some implementations.

Thus, FIG. 4 illustrates various example sub-components of the data analysis component 114 of FIG. 1. According to various embodiments, the asset data sorting component 460 of the data analysis component 114 may receive the asset data 372 (associated with an individual asset) from the database(s) 120 and may sort hours by source bytes, in descending order. According to various embodiments, the median computation component 462 of the data analysis component 114 may compute a median value for the logarithmic values for the calculated outgoing source byte totals (e.g., by starting from the "top" of the sorted list and computing the median value for all "higher" rows in the sorted list). According to various embodiments, the derivative computation component 464 of the data analysis component 114 may calculate the derivative of the median of "higher" rows. According to various embodiments, the threshold evaluation component 466 of the data analysis component 114 may determine a threshold for identifying "hotspots" in outgoing network traffic for the individual asset.

Figure 5:
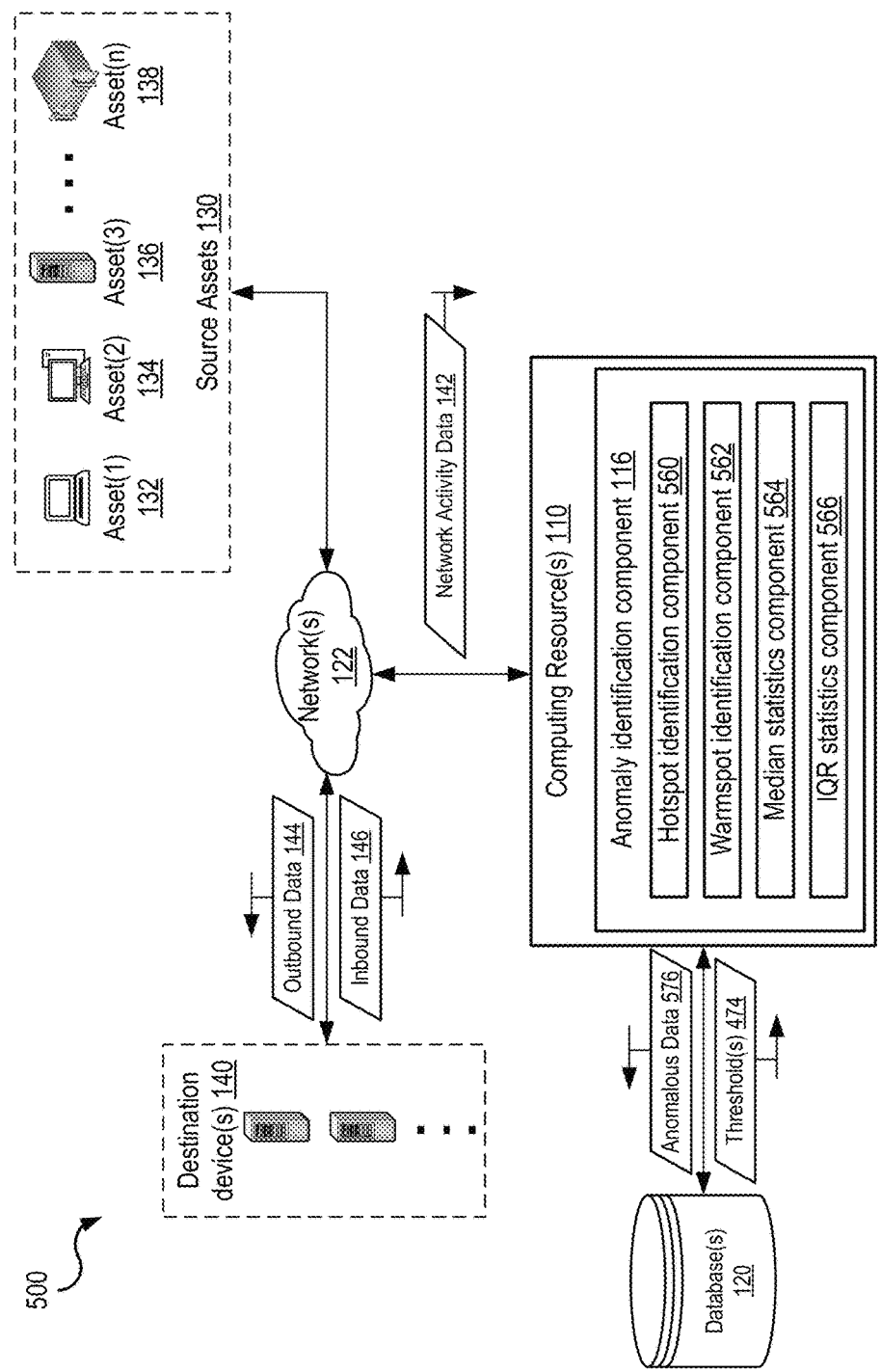
FIG. 5 is a block diagram illustrating select components of the example system depicted in FIG. 1 that implements anomalous data transfer detection, in accordance with some embodiments.

FIG. 5 is a block diagram 500 illustrating select components of the example system 100 depicted in FIG. 1 that implements anomalous data transfer detection, in accordance with some embodiments. In the particular embodiment depicted in FIG. 5, various example sub-components of the anomaly identification component 116 of FIG. 1 are illustrated and include: a "hotspot" identification component 560; a "warmspot" identification component 562; a median statistics component 564; and an interquartile range (IQR) statistics component 566. It will be appreciated that the example depicted in FIG. 5 is for illustrative purposes only and that the anomaly identification component 116 may contain an alternative number and/or arrangement of sub-components.

According to various embodiments, the hotspot identification component 560 may be configured to receive a threshold associated with a particular asset that is stored at the database(s) 120 as one of the threshold(s) 474. The hotspot identification component 560 may be configured to identify "hotspots" as all the hours in which the logarithmic values for the calculated outgoing source byte totals exceed the calculated threshold for identifying "hotspots" in outgoing network traffic for the particular asset (as described herein with respect to the threshold evaluation component 466 of FIG. 4). Additional details regarding example processes of identifying "hotspots" for a particular asset are illustrated and further described herein with respect to FIGS. 7 and 8.

According to various embodiments, the warmspot identification component 562 may be configured to receive a threshold associated with a particular asset that is stored at the database(s) 120 as one of the threshold(s) 474. The warmspot identification component 562 may be configured to identify "warmspots" by utilizing the previously described "hotspot" approach that is adjusted to account for time periods such as nights and weekends for assets that may typically be active only during working hours on weekdays. Additional details regarding example processes of identifying "warmspots" for a particular asset are illustrated and further described herein with respect to FIGS. 9 and 10.

According to various embodiments, FIG. 5 illustrates that the identified "hotspots" may be utilized to compute various statistics that define a baseline. In the example depicted in FIG. 5, the median statistics component 564 may be configured to compute a median value, and the IQR statistics component 566 may be configured to compute an IQR value. The IQR statistics component 566 may calculate the interquartile range (IQR), where the IQR is the statistical dispersion of results between the 25th percentile ($Q_1$) and the 75th percentile ($Q_3$). In other words, the IQR is the statistical dispersion in the middle 50% of the outgoing traffic originating from a particular asset. The IQR is the difference between $Q_3$ and $Q_1$ (i.e., IQR=$Q_3$-$Q_1$).

As described herein, computed statistics such as the median value and the IQR value may be utilized to identify anomalous data transfer events. In anomaly detection systems, anomalies may be determined using these computed statistics. For example, any outgoing data transfer values may be considered anomalous when such values exceed a particular computed value, such as outgoing data transfer values exceeding a value computed according to the following formula: (median+2*IQR). That is, an outgoing data transfer value exceeding the value computed according to the formula may be considered an anomalous data transfer event, which may be indicative of a data exfiltration event (or a misconfiguration or an accidental data transfer) and may trigger an alert, as further described herein with respect to FIG. 6. The IQR-based approach therefore works well to identify anomalies in situations in where there are large outliers. In these types of cases, other anomaly detection techniques may obtain inaccurate results as these extreme outliers may skew the data themselves. FIG. 5 further illustrates that one or more of the sub-components 560-566 of the anomaly identification component may be configured to store anomalous data 576 at the database(s) 120, according to various embodiments.

Thus, FIG. 5 illustrates various example sub-components of the anomaly identification component 116 of FIG. 1. According to various embodiments, the hotspot identification component 560 of the anomaly identification component 116 may identify "hotspots" as all the hours in which the logarithmic values for the calculated outgoing source byte totals exceed the calculated threshold for identifying "hotspots" in outgoing network traffic for a particular asset. According to various embodiments, the warmspot identification component 562 of the anomaly identification component 116 may identify "warmspots" by utilizing the previously described "hotspot" approach that is adjusted to account for time periods such as nights and weekends for assets that may typically be active only during working hours on weekdays. According to various embodiments, the median statistics component 564 and the and the IQR statistics component 566 of the anomaly identification component 116 may compute a median value and an IQR value, respectively. As described herein, computed statistics such as the median value and the IQR value may be utilized to identify anomalous data transfer events. As described herein, identifying anomalous data transfer events in such a manner may be advantageous for security personnel by potentially reducing false positives and associated "alert fatigue", among numerous other advantages.

Figure 6:
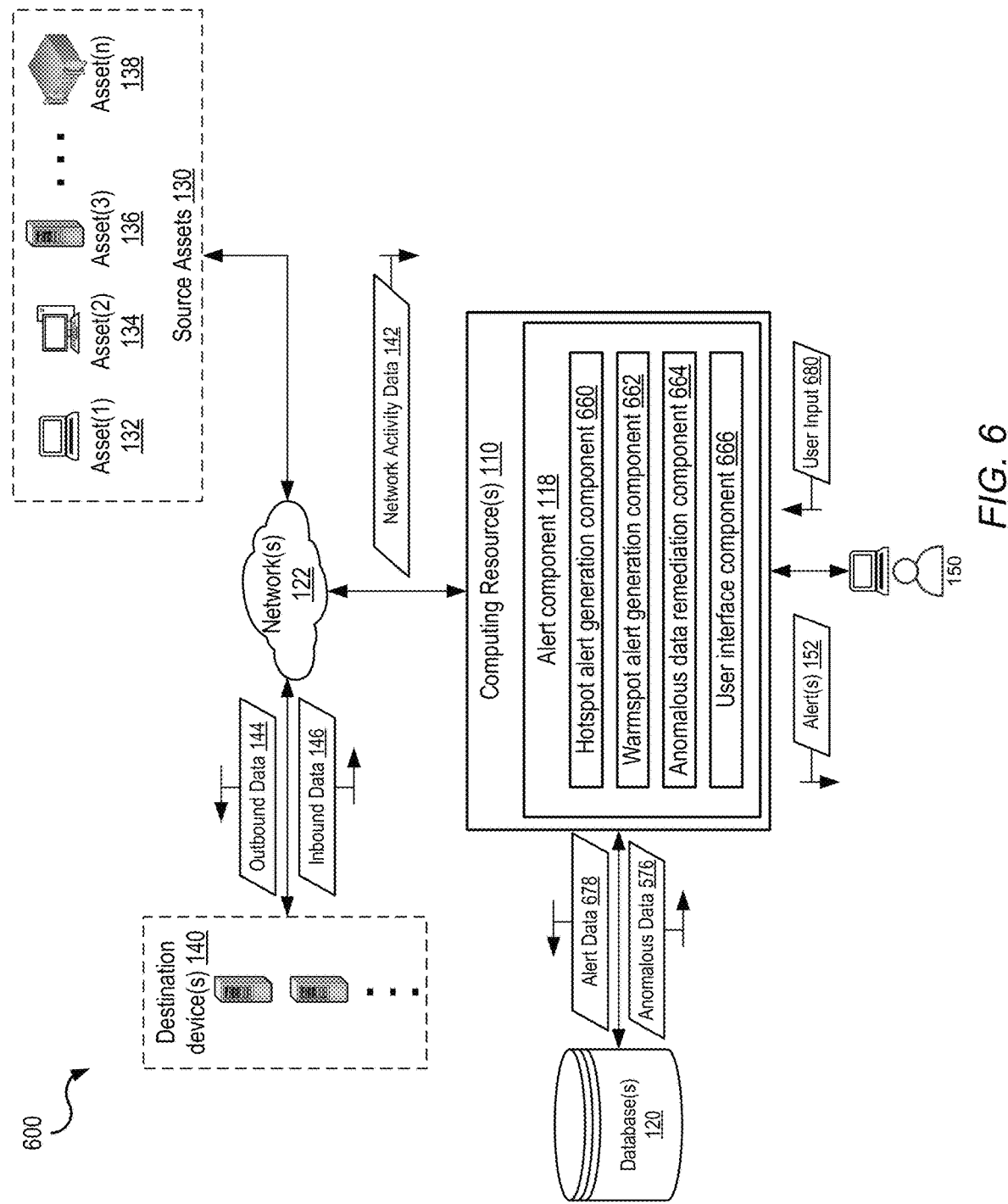
FIG. 6 is a block diagram illustrating select components of the example system depicted in FIG. 1 that implements anomalous data transfer detection, in accordance with some embodiments.

FIG. 6 is a block diagram 600 illustrating select components of the example system 100 depicted in FIG. 1 that implements anomalous data transfer detection, in accordance with some embodiments. In the particular embodiment depicted in FIG. 6, various example sub-components of the alert component 118 of FIG. 1 are illustrated and include: a "hotspot" alert generation component 660; a "warmspot" alert generation component 662; an anomalous data remediation component 664; and a user interface component 666. It will be appreciated that the example depicted in FIG. 6 is for illustrative purposes only and that the alert component 118 may contain an alternative number and/or arrangement of sub-components.

According to various embodiments, the alert component 118 may be configured to receive the anomalous data 576 stored at the database(s) 120, as described herein with respect to FIG. 5. In some cases, the anomalous data 576 may be associated with a first anomalous data transfer threshold being exceeded. In such cases, the hotspot alert generation component 660 may generate the alert(s) 152 (e.g., for presentation to the user 150 via the user interface component 666). In other cases, the anomalous data 576 may be associated with a second anomalous data transfer threshold being exceeded. In such cases, the warmspot alert generation component 662 may generate the alert(s) 152 (e.g., for presentation to the user 150 via the user interface component 666).

According to some implementations, a post-processing "de-noising" stage may be utilized, in which at least one of the one or more alerts 152 triggered during periods of relatively large inbound data transfers may be filtered. To illustrate, the alert component 118 may be configured to determine whether the inbound data 146 received as part of the network activity data 142 for a particular asset is relatively large compared to the outbound data 144 received as part of the network activity data 142 for the particular asset. In such cases, the alert component 118 may selectively determine whether to generate the alert(s) 152 for presentation to the user 150 or to filter the alert(s) 152, according to some implementations. As an illustrative, non-limiting example, the outbound data 144 and the inbound data 146 associated with a video-conferencing session conducted over the network(s) 122 may represent an example in which an amount of the outbound data 144 may normally trigger the alert(s) 152 but a comparable amount of the inbound data 146 may be indicative of a false positive.

FIG. 6 illustrates an example in which the user 150 (e.g., security personnel) may provide user input 680 (e.g., via the user interface component 666). In some cases, the user input 680 may include information to be processed by the anomalous data remediation component 664. In other cases, the user input 680 may include information regarding whether the alert(s) 152 represent true positive(s) or false positive(s). According to various embodiments, FIG. 6 further illustrates that the alert component 118 may store alert data 678 associated with the alert(s) 152 at the database(s) 120. In some cases, at least a portion of the user input 680 may be stored at the database(s) 120 in association with the alert data 678.

Thus, FIG. 6 illustrates various example sub-components of the alert component 118 of FIG. 1. According to some embodiments, the alert component 118 may receive the anomalous data 576 stored at the database(s) 120, which may be associated with a first anomalous data transfer threshold being exceeded. In such cases, the hotspot alert generation component 660 may generate the alert(s) 152 (e.g., for presentation to the user 150 via the user interface component 666). In other cases, the anomalous data 576 may be associated with a second anomalous data transfer threshold being exceeded. In such cases, the warmspot alert generation component 662 may generate the alert(s) 152 (e.g., for presentation to the user 150 via the user interface component 666).

Figure 7:
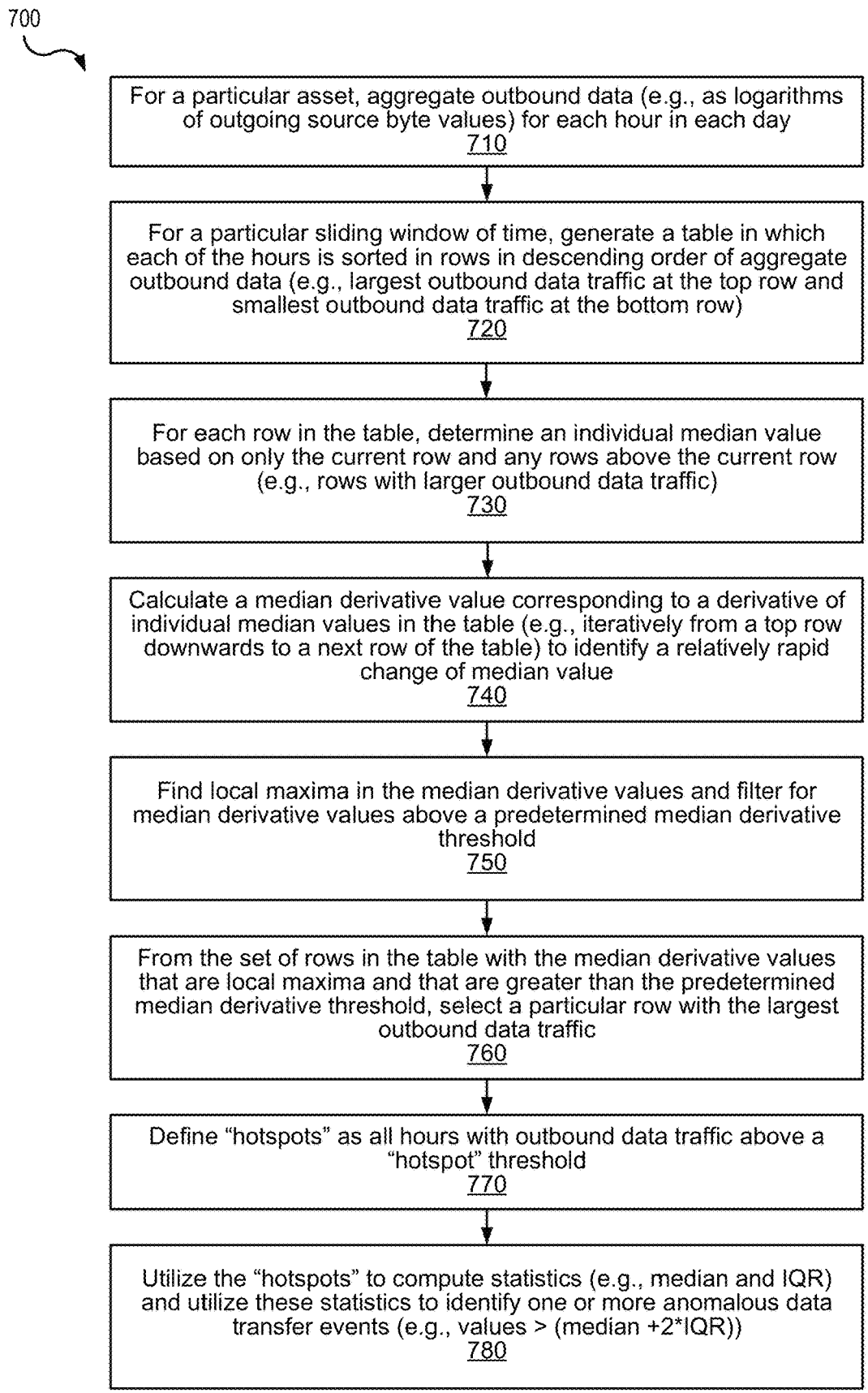
FIG. 7 is a flowchart that illustrates an example of an anomalous data transfer detection process, according to some embodiments.

FIG. 7 is a flowchart 700 that illustrates an example of an anomalous data transfer detection process, according to some embodiments. According to various embodiments, one or more hardware processors (with associated memory) may be used to implement the anomalous data transfer detection process depicted in the example of FIG. 7.

At operation 710, the process may include aggregating outbound data (e.g., as logarithms of outgoing source byte values) for each hour in each day for a particular asset. For example, referring to FIG. 3, the source asset data grouping component 362 may aggregate at least a portion of the outbound data 144 associated with a particular asset having the asset identifier 370 (e.g., one of the individual assets 132-138 of the set of source assets 130), and the source asset data storage component 364 may store the aggregated outbound data at the database(s) 120 as the asset data 372.

At operation 720, the process includes generating a table for a particular sliding window of time. Each of the hours in the table is sorted in rows in descending order of aggregate outbound data (e.g., largest outbound data traffic at the top row and smallest outbound data traffic at the bottom row). For example, referring to FIG. 4, the asset data sorting component 460 may generate such a table in which each of the hours is sorted in rows in descending order of aggregate outbound data.

At operation 730, the process includes determining, for each row in the table, an individual median value based on only the current row and any rows above the current row (e.g., rows with larger outbound data traffic). For example, referring to FIG. 4, the median computation component 462 may determine the individual median value.

At operation 740, the process includes calculating a median derivative value corresponding to a derivative of individual median values in the table (e.g., iteratively from a top row downwards to a next row of the table) to identify a relatively rapid change of median value. For example, referring to FIG. 4, the derivative computation component 464 may calculate the median derivative value to identify a relatively rapid change of median value.

At operation 750, the process includes finding local maxima in the median derivative values and filtering for median derivative values above a predetermined median derivative threshold. For example, referring to FIG. 4, the threshold evaluation component 466 may find local maxima in the median derivative values (as calculated by the derivative computation component 464) and filter for median derivative values above a predetermined median threshold.

At operation 760, the process includes selecting, from the set of rows in the table with the median derivative values that are local maxima and that are greater than the predetermined median threshold, a particular row with the largest outbound data traffic.

For example, referring to FIG. 4, the threshold evaluation component 466 may select particular row from the table with the largest outbound data traffic.

At operation 770, the process includes defining "hotspots" as all hours with outbound data traffic above a "hotspot" threshold. For example, referring to FIG. 4, the threshold evaluation component 466 may store the threshold(s) 474 in the database(s) 120, and the stored threshold(s) 474 may be utilized by the hotspot identification component 560 as "hotspot" threshold(s) in order to identify one or more "hotspots" in outgoing data from a particular asset.

At operation 780, the process includes utilizing the "hotspots" to compute statistics (e.g., median and IQR) and utilizing these statistics to identify one or more anomalous data transfer events (e.g., where values exceed: median+ 2*IQR). For example, referring to FIG. 5, the median statistics component 564 and the and the IQR statistics component 566 of the anomaly identification component 116 may compute a median value and an IQR value, respectively. As described herein, computed statistics such as the median value and the IQR value may be utilized to identify anomalous data transfer events.

Thus, FIG. 7 illustrates an example of a process of anomalous data transfer detection. The example process depicted in FIG. 7 may utilize computed statistics such as the median value and the IQR value to identify anomalous data transfer events. As described herein, identifying anomalous data transfer events in such a manner may be advantageous for security personnel by potentially reducing false positives and associated "alert fatigue", among numerous other advantages.

FIG. 8 is a flowchart 800 that illustrates an example of a process of anomalous data transfer detection, according to some embodiments. According to various embodiments, one or more hardware processors (with associated memory) may be used to implement the anomalous data transfer detection process depicted in the example of FIG. 8.

At operation 810, the process includes determining hotspots for an asset of an organization. The hotspots correspond to one or more periods of time in which outbound data from the asset satisfies a hotspot threshold determined to be indicative of high outbound data traffic activity. For example, referring to FIG. 5, the hotspot identification component 560 of the anomaly identification component 116 may determine hotspots for a particular asset of an organization (e.g., one of the assets 132-138 of the set of source assets 130). As described herein, the "hotspots" identified by the hotspot identification component 560 may correspond to one or more periods of time in which a subset of the outbound data 144 (originating from the particular asset) satisfies a hotspot threshold (of the one or more thresholds 474 stored at the one or more databases 120). As further described herein with respect to FIG. 4, the hotspot threshold (corresponding to a particular threshold of the one or more thresholds 474 computed by the sub-components of the data analysis component 114) may be indicative of high outbound data traffic activity for the particular asset. As described herein, the hotspot identification component 560 may be configured to identify "hotspots" as all the hours in which the logarithmic values for the calculated outgoing source byte totals exceed the calculated threshold for identifying "hotspots" in outgoing network traffic for the particular asset.

At operation 820, the process includes filtering out, from the outbound data, a subset of data that does not correspond to the hotspots. The remaining data after filtering out the subset of data corresponds to a hotspot dataset associated with the hotspots. For example, referring to FIG. 4, one or more of the sub-components of the data analysis component 114 may be configured to filter out, from the outbound data, a subset of data that does not correspond to the hotspots. To illustrate, the threshold evaluation component 466 (of the data analysis component 114) may find the local maxima in the derivative (as computed by the derivative computation component 464 of the data analysis component 114). The threshold evaluation component 466 may filter for those above a certain threshold for the median derivative (which may be preset and consistent across all assets, according to some implementations). The threshold evaluation component 466 may select a local maximum (that is greater than the threshold) with the greatest logarithmic value for the calculated outgoing source byte totals.

At operation 830, the process includes utilizing the hotspot dataset to detect anomalous data transfer activity associated with the asset. Detecting the anomalous data transfer activity includes computing one or more statistics on the hotspot dataset. For example, referring to FIG. 5, the median statistics component 564 and the and the IQR statistics component 566 (of the anomaly identification component 116) may compute a median value and an IQR value, respectively. As described herein, computed statistics such as the median value and the IQR value may be utilized to identify anomalous data transfer events (originating from the particular asset).

At operation 840, the process includes generating an alert associated with the asset, responsive to detecting the anomalous data transfer activity. For example, referring to FIG. 6, one or more sub-components of the alert component 118 may be configured to generate the alert(s) 152 associated with the particular asset, responsive to detecting the anomalous data transfer activity (from the particular asset). To illustrate, the alert component 118 of FIG. 6 may be configured to receive the anomalous data 576 stored at the database(s) 120, as described herein with respect to FIG. 5. The anomalous data 576 may be associated with a first anomalous data transfer threshold being exceeded, and the hotspot alert generation component 660 of FIG. 6 may generate the alert(s) 152 (e.g., for presentation to the user 150 via the user interface component 666).

Thus, FIG. 8 illustrates an example of a process of anomalous data transfer detection. The example anomalous data transfer detection process depicted in FIG. 8 may be advantageous for security personnel by potentially reducing false positives and associated "alert fatigue", among numerous other advantages.

Figure 9:
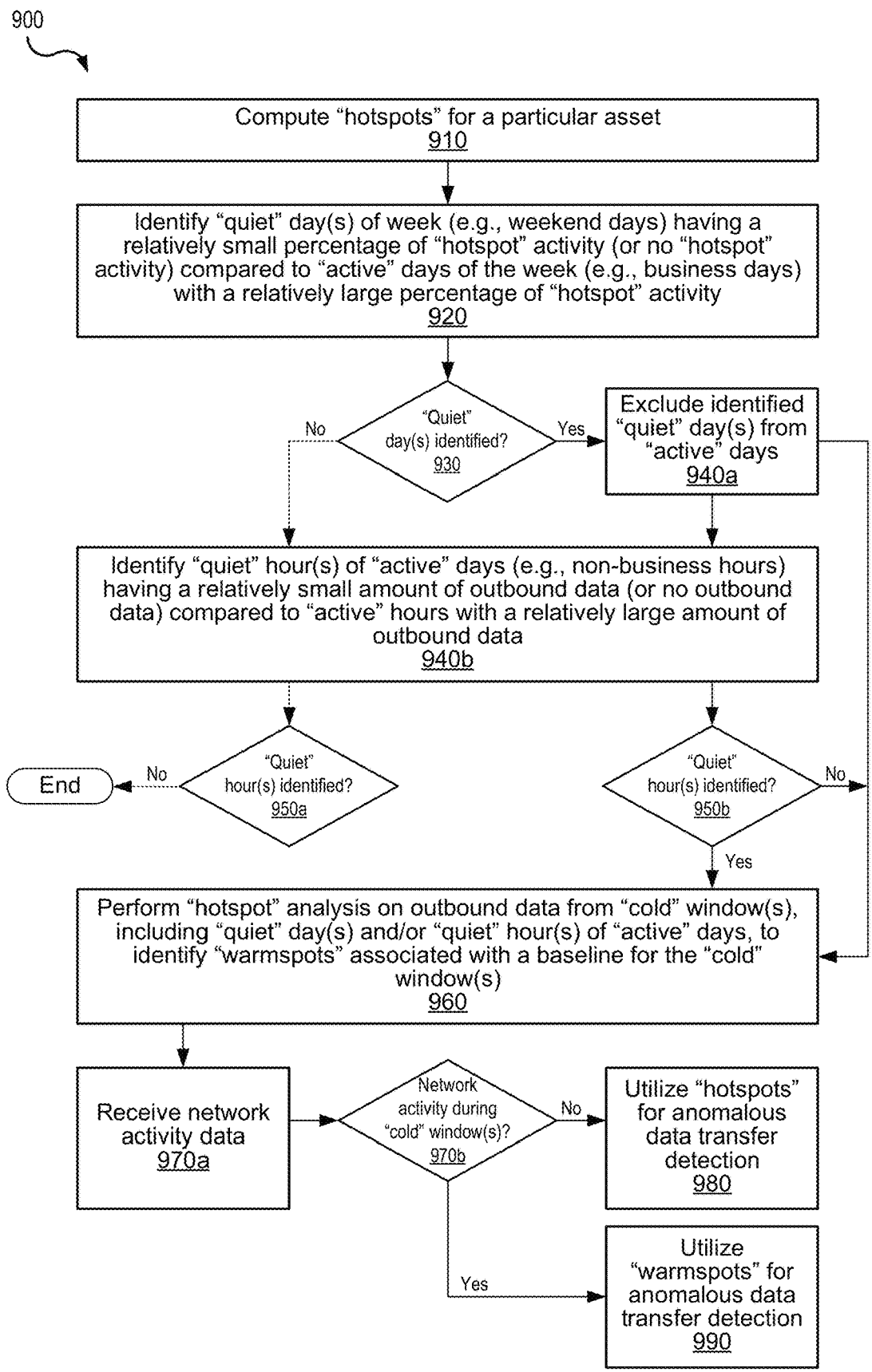
FIG. 9 is a flowchart that illustrates an example of an anomalous data transfer detection process, according to some embodiments.

FIG. 9 is a flowchart 900 that illustrates an example of a process of anomalous data transfer detection, according to some embodiments. According to various embodiments, one or more hardware processors (with associated memory) may be used to implement the anomalous data transfer detection process depicted in the example of FIG. 9.

At operation 910, the process includes computing "hotspots" for a particular asset. For example, referring to FIG. 4, the threshold evaluation component 466 may store the threshold(s) 474 in the database(s) 120, and the stored threshold(s) 474 may be utilized to identify one or more "hotspots" in outgoing data from a particular asset.

At operation 920, the process includes identifying one or more "quiet" days of the week having a relatively small percentage of "hotspot" activity (or no "hotspot" activity) compared to "active" days of the week with a relatively large percentage of "hotspot" activity. For example, referring to FIG. 5, the warmspot identification component 582 may identify such "quiet" day(s) based on historical data stored at the database(s) 120. To illustrate, the "quiet" day(s) of the week may correspond to non-business days, such as weekend days. The "active" days of the week may correspond to business days, such as week days.

At operation 930, the process includes determining whether one or more "quiet" days were identified (at operation 920). If "quiet" days were identified, the process may proceed to operation 940a. If no "quiet" days were identified, the process may proceed to operation 940b.

At operation 940a, the process includes excluding the identified "quiet" day(s) from the "active" days. At operation 940b, the process includes identifying one or more "quiet" hours of "active" days having a relatively small amount of outbound data (or no outbound data) compared to "active" hours with a relatively large amount of outbound data. For example, referring to FIG. 5, the warmspot identification component 582 may identify such "quiet" hour(s) of "active" days based on historical data stored at the database(s) 120.

Following operation 940b, the process may proceed to either operation 950a or operation 950b to determine whether one or more "quiet" hours were identified (at operation 940b). FIG. 9 is designed to illustrate that operation 950a is to be performed in cases where no "quiet" day(s) were identified (at operation 930). In such cases, the process may end. As used herein, the term "cold" window is used to refer to a combined set of quiet day(s) of week and quiet hour(s) of day. Thus, the path from operation 930 to operation 940b to operation 950a is designed to illustrate that not all assets have "cold" windows. Some assets are active sporadically without any pattern or are active all the time. In such cases, the process ends and does not proceed to operation 960.

FIG. 9 is further designed to illustrate that operation 950b is to be performed in cases where one or more "quiet" days were identified (at operation 930). Thus, the path from operation 930 to operation 940a to operation 940b to operation 950b is designed to illustrate an example of an asset that has one or more "cold" windows. That is, the asset has at least one or more quiet days identified (as determined at operation 930). Additionally, FIG. 9 illustrates that the asset may also have one or more quiet hours identified (as determined at operation 950b). In such a case where the asset has both quiet day(s) as well as quiet hour(s), the process proceeds from operation 950b to operation 960.

At operation 960, the process includes performing "hotspot" analysis on outbound data from one or more "cold" window(s), including "quiet" day(s) and/or "quiet" hour(s) of "active" days, to identify "warmspots" associated with a baseline for the "cold" window(s). The baseline for the "cold" window(s) is typically lower than the baseline for "hotspots," as would be expected when comparing weekend activity to working day activity (as an example). For example, referring to FIG. 5, the warmspot identification component 562 may perform "hotspot" analysis to identify "warmspots" associated with a baseline for the "cold" window(s).

At operation 970a, the process includes receiving network activity data. At operation 970b, the process includes determining whether the network activity data is indicative of network activity during the one or more "cold" windows. For example, referring to FIG. 5, the warmspot identification component 562 may utilize data retrieved from the database(s) 120 to determine whether there is network activity associated with a particular asset of the set of source assets 130 during the "cold" window(s).

Responsive to determining that there is no network activity during the "cold" window(s), the process may proceed to operation 980. Responsive to determining that there is network activity during the "cold" window(s), the process may process to operation 990.

At operation 980, the process includes utilizing "hotspots" for anomalous data transfer detection. For example, referring to FIG. 5, the hotspot identification component 560 may utilize "hotspots" in conjunction with statistics computed by the median statistics component 564 and the IQR statistics component 566 for anomalous data transfer detection.

At operation 990, the process includes utilizing "warmspots" for anomalous data transfer detection. For example, referring to FIG. 5, the warmspot identification component 562 may utilize "warmspots" in conjunction with statistics computed by the median statistics component 564 and the IQR statistics component 566 for anomalous data transfer detection.

Thus, FIG. 9 illustrates an example of a process of anomalous data transfer detection. The example anomalous data transfer detection process depicted in FIG. 9 may be advantageous for security personnel by potentially reducing false positives and associated "alert fatigue", among numerous other advantages.

Figure 10:
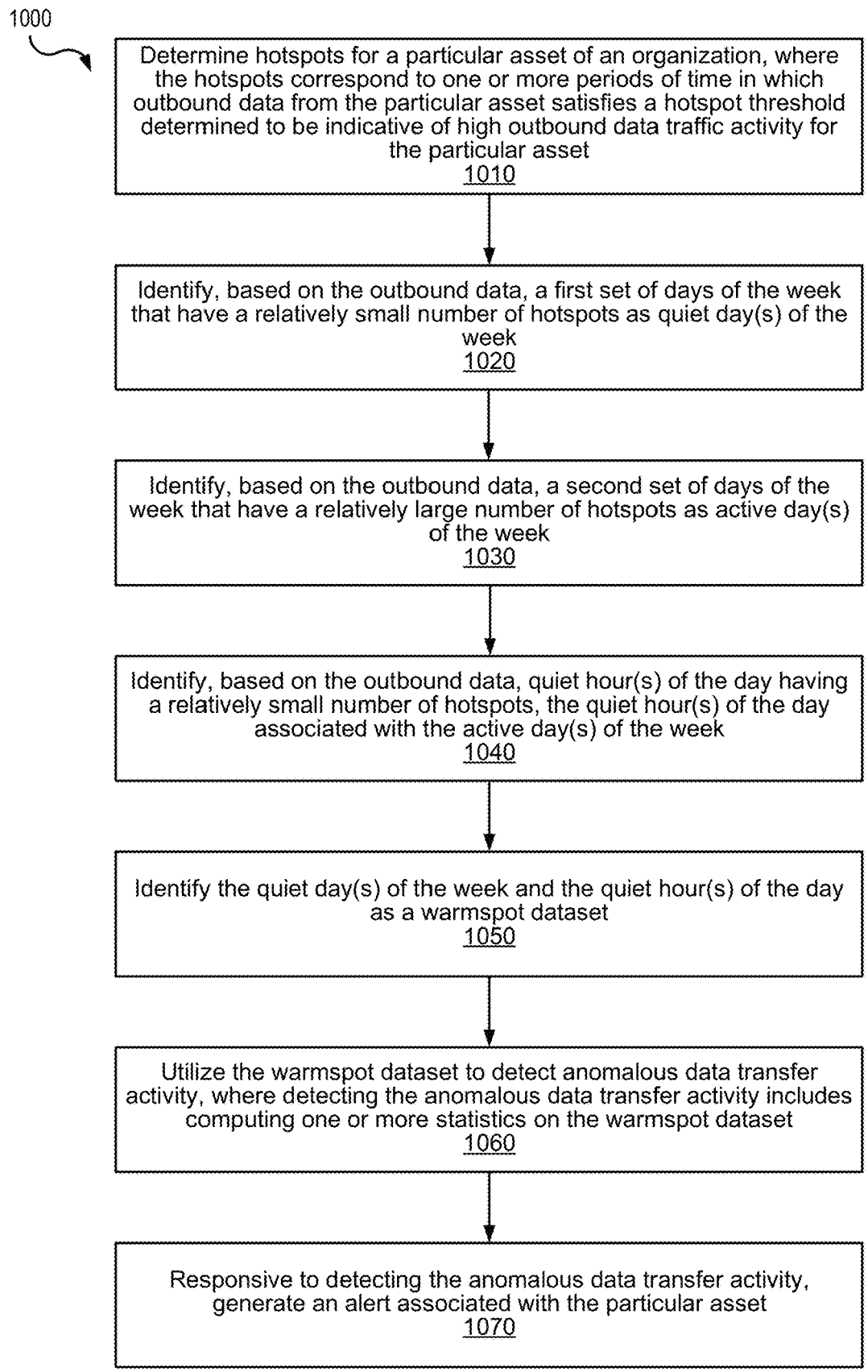
FIG. 10 is a flowchart that illustrates an example of an anomalous data transfer detection process, according to some embodiments.

FIG. 10 is a flowchart 1000 that illustrates an example of a process of anomalous data transfer detection, according to some embodiments. According to various embodiments, one or more hardware processors (with associated memory) may be used to implement the anomalous data transfer detection process depicted in the example of FIG. 10.

At operation 1010, the process includes determining hotspots for an asset of an organization. The hotspots correspond to one or more periods of time in which outbound data from the asset satisfies a hotspot threshold determined to be indicative of high outbound data traffic activity. For example, referring to FIG. 5, the hotspot identification component 560 of the anomaly identification component 116 may determine hotspots for a particular asset of an organization (e.g., one of the assets 132-138 of the set of source assets 130). As described herein, the "hotspots" identified by the hotspot identification component 560 may correspond to one or more periods of time in which a subset of the outbound data 144 (originating from the particular asset) satisfies a hotspot threshold (of the one or more thresholds 474 stored at the one or more databases 120). As further described herein with respect to FIG. 4, the hotspot threshold (corresponding to a particular threshold of the one or more thresholds 474 computed by the sub-components of the data analysis component 114) may be indicative of high outbound data traffic activity for the particular asset. As described herein, the hotspot identification component 560 may be configured to identify "hotspots" as all the hours in which the logarithmic values for the calculated outgoing source byte totals exceed the calculated threshold for identifying "hotspots" in outgoing network traffic for the particular asset.

At operation 1020, the process includes identifying, based on the outbound data, a first set of days of the week that have a relatively small number of hotspots as one or more quiet days of the week. For example, referring to FIG. 5, the warmspot identification component 562 of the anomaly identification component 116 may utilize the previously described "hotspot" approach that is adjusted in order to identify a first set of days of the week that have a relatively small number of hotspots as one or more "quiet" days of the week.

At operation 1030, the process includes identifying, based on the outbound data, a second set of days of the week that have a relatively large number of hotspots as one or more active days of the week. For example, referring to FIG. 5, the warmspot identification component 562 of the anomaly identification component 116 may utilize the previously described "hotspot" approach that is adjusted in order to identify a second set of days of the week that have a relatively small number of hotspots as one or more "active" days of the week.

At operation 1040, the process includes identifying, based on the outbound data, one or more quiet hours of the day having a relatively small number of hotspots. The one or more quiet hours of the day associated with the one or more active days of the week. For example, referring to FIG. 5, the warmspot identification component 562 of the anomaly identification component 116 may identify the quiet hour(s) of the day as one or more hours of the "active" day(s) that have a relatively small number of hotspots.

At operation 1050, the process includes identifying the one or more quiet days of the week and the one or more quiet hours of the day as a warmspot dataset. For example, referring to FIG. 5, the warmspot identification component 562 of the anomaly identification component 116 may identify the quiet day(s) of the week and the quiet hour(s) of the day as a warmspot dataset.

At operation 1060, the process includes utilizing the warmspot dataset to detect anomalous data transfer activity associated with the asset. Detecting the anomalous data transfer activity includes computing one or more statistics on the warmspot dataset. For example, referring to FIG. 5, the warmspot identification component 562 of the anomaly identification component 116 may perform "hotspot" analysis as described herein on outbound data from one or more "cold" windows (including the "quiet" day(s) of the week and/or the "quiet" hours of the day) to identify "warmspots" associated with a baseline for the "cold" window(s). To illustrate, according to some embodiments, the warmspot identification component 562 may perform operations 970*a* and 970*b*, as previously described herein with respect to FIG. 9. For example, referring to FIG. 5, the warmspot identification component 562 may utilize data retrieved from the database(s) 120 to determine whether there is network activity associated with a particular asset of the set of source assets 130 during the "cold" window(s). According to some embodiments, the warmspot identification component 562 may perform either operation 980 or operation 990 depending on the result of operation 970*b*, as previously described herein with respect to FIG. 9. For example, in some cases (corresponding to operation 980), the hotspot identification component 560 of FIG. 5 may utilize "hotspots" in conjunction with statistics computed by the median statistics component 564 and the IQR statistics component 566 for anomalous data transfer detection. As another example, in some cases (corresponding to operation 990), the warmspot identification component 562 of FIG. 5 may utilize "warmspots" in conjunction with statistics computed by the median statistics component 564 and the IQR statistics component 566 for anomalous data transfer detection.

At operation 1070, the process includes generating an alert associated with the asset, responsive to detecting the anomalous data transfer activity. For example, referring to FIG. 6, one or more sub-components of the alert component 118 may be configured to generate the alert(s) 152 associated with the particular asset, responsive to detecting the anomalous data transfer activity (from the particular asset). To illustrate, the alert component 118 of FIG. 6 may be configured to receive the anomalous data 576 stored at the database(s) 120, as described herein with respect to FIG. 5. The anomalous data 576 may be associated with a second anomalous data transfer threshold being exceeded, and the warmspot alert generation component 662 of FIG. 6 may generate the alert(s) 152 (e.g., for presentation to the user 150 via the user interface component 666).

Thus, FIG. 10 illustrates an example of a process of anomalous data transfer detection. The example anomalous data transfer detection process depicted in FIG. 10 may be advantageous for security personnel by potentially reducing false positives and associated "alert fatigue", among numerous other advantages.

FIG. 11 is a block diagram illustrating an example computer system 1100 that is used to implement one or more portions of a system that implements anomalous data transfer detection, according to some embodiments. For example, in some cases, the computer system 1100 may be a server that implements one or more components of the computing resource(s) 110 depicted in FIG. 1.

Computer system 1100 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1100 includes one or more processors 1110, which may include multiple cores coupled to a system memory 1120 via an input/output (I/O) interface 1130. Computer system 1100 further includes a network interface 1140 coupled to I/O interface 1130. In some embodiments, computer system 1100 may be a uniprocessor system including one processor 1110, or a multiprocessor system including several processors 1110*a-n*, as shown. The processors 1110 may be any suitable processors capable of executing instructions. For example, in various embodiments, processors 1110 may implement one of a number of instruction set architectures (ISAs), such as the x86, PowerPC, SPARC, or MIPS ISA.

As shown, the computer system 1100 may also include one or more network communication devices (e.g., network interface 1140) for communicating with other systems and/or components over a communications network. For example, an instance of an application executing on computer system 1100 may use network interface 1140 to communicate with another server application executing on another computer system, as described herein.

As shown, computer system 1100 may use its network interface 1140 to communicate with one or more other devices 1160, such as persistent storage devices and/or one or more I/O devices. In some embodiments, some of these other devices may be implemented locally on the computer system 1100, accessible via the I/O interface 1130. In various embodiments, persistent storage devices may include disk drives, tape drives, solid state memory, other mass storage devices, or any other persistent storage device. The computer system 1100 may store instructions and/or data in persistent storage devices, and retrieve the stored instruction and/or data as needed.

As shown, the computer system 1100 may include one or more system memories 1120 that store instructions and data accessible by processor(s) 1110. In various embodiments, system memories 1120 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1120 may be used to store code 1125 or executable instructions to implement the methods and techniques described herein. For example, in some cases, the executable instructions may include instructions to implement the data selection component 112, the data analysis component 114, the anomaly identification component 116, and the alert component 118, as discussed.

The system memory 1120 may also be used to store data 1126 needed or produced by the executable instructions. For example, the in-memory data 1126 may include portions of the one or more databases 120 and the network activity data 142, as discussed.

In some embodiments, some of the code 1125 or executable instructions may be persistently stored on the computer system 1100 and may have been loaded from external storage media. The persistent storage of the computer system 1100 and the external media are examples of non-transitory computer-readable storage media, which may be used to store program instructions to be executed by the computer system 1100. A non-transitory computer-readable storage medium may provide the capability to store information in a form readable by a machine (e.g., computer system 1100). Non-transitory computer-readable media may include storage media such as magnetic or optical media, disk or DVD/CD-ROM devices, archival tapes, network-attached storage systems, or other computer systems.

In some embodiments, the I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

In some embodiments, the network interface 1140 may allow data to be exchanged between computer system 1100 and other devices attached to a network. The network interface 1140 may also allow communication between computer system 1100 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 1100 or may be distributed on various nodes of a distributed system that includes computer system 1100. In some embodiments, similar input/output devices may be separate from computer system 1100 and may interact with one or more nodes of a distributed system that includes computer system 1100 through a wired or wireless connection, such as over network interface 1140. Network interface 1140 may commonly support one or more wireless networking protocols (e.g., Wi-Fi/IEEE 802.11, or another wireless networking standard). In some embodiments, the network interface 1140 may support communication via telecommunications/telephony networks such as analog voice networks or digital fiber communications networks, via storage area networks such as Fibre Channel SANs, or via any other suitable type of network and/or protocol.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:
   one or more hardware processors with associated memory that implement anomalous data transfer detection, wherein the one or more hardware processors are configured to:
      determine hotspots for a particular asset of an organization, wherein the hotspots correspond to one or more periods of time in which outbound data from the particular asset satisfies a hotspot threshold determined to be indicative of high outbound data traffic activity for the particular asset;
      identify, based on the outbound data, a first set of days of the week as one or more quiet days of the week based on a number of hotspots in the first set of days of the week;
      identify, based on the outbound data, a second set of days of the week as one or more active days of the week based on a number of hotspots in the second set of days of the week;
      identify, based on the outbound data, one or more quiet hours of the day associated with the one or more active days of the week based on a number of hotspots in the one or more quiet hours of the day;
      identify the one or more quiet days of the week and the one or more quiet hours of the day as a warmspot dataset associated with one or more warmspots;
      utilize the warmspot dataset to detect anomalous data transfer activity associated with the particular asset, wherein, to detect the anomalous data transfer activity, the one or more hardware processors are configured to compute one or more statistics on the warmspot dataset; and
      responsive to detecting the anomalous data transfer activity, generate an alert associated with the particular asset.

2. The system of claim 1, wherein the one or more hardware processors are further configured to:
- determine the hotspot threshold associated with the particular asset, wherein, to determine the hotspot threshold, the one or more hardware processors are configured to:
  - aggregate outgoing source bytes from the particular asset at different hours of different days to calculate outgoing source byte totals for individual hours of individual days;
  - calculate logarithmic values associated with the individual outgoing source byte totals;
  - sort the individual hours of the individual days into a table of rows, in descending order according to the calculated logarithmic values,
  - compute, for each individual row in the table, median values based on the calculated logarithmic values for a particular individual row and each higher row in the table;
  - calculate, for each individual row in the table, derivative values based on a difference between the computed median value associated with the particular individual row and the computed median value associated with a next higher row in the table;
  - identify all local maxima in the derivative values;
  - filter the local maxima that exceed a derivative value threshold; and
  - identify the hotspot threshold associated with the particular asset as a particular local maximum having the largest calculated logarithmic value.

3. The system of claim 2, wherein the hotspots for the particular asset correspond to all hours having calculated logarithmic values that exceed the hotspot threshold.

4. The system of claim 2, wherein, to determine the hotspot threshold, the one or more hardware processors are further configured to:
- retrieve an asset identifier associated with the particular asset; and
- utilize the asset identifier to analyze network activity data of the organization in order to calculate the outgoing source bytes.

5. The system of claim 1, wherein to compute the one or more statistics on the warmspot dataset, the one or more hardware processors are further configured to:
- calculate, for the one or more warmspots, the one or more statistics, wherein the calculated statistics include at least a median value and an interquartile range (IQR) value that are utilized to define a baseline value; and
- identify an outbound data transfer value from the particular asset exceeding the baseline value as an anomalous data transfer event.

6. The system of claim 5, wherein the baseline value corresponds to a sum of the median value and twice the IQR value.

7. The system of claim 1, wherein, to generate the alert associated with the particular asset, the one or more hardware processors are further configured to present information associated with the anomalous data transfer activity via a user interface component.

8. A method comprising:
- implementing, using one or more hardware processors, anomalous data transfer detection,
  - wherein the implementing comprises:
    - determining hotspots for a particular asset of an organization, wherein the hotspots correspond to one or more periods of time in which outbound data from the particular asset satisfies a hotspot threshold determined to be indicative of high outbound data traffic activity for the particular asset;
    - identifying, based on the outbound data, a first set of days of the week as one or more quiet days of the week based on a number of hotspots in the first set of days of the week;
    - identifying, based on the outbound data, a second set of days of the week as one or more active days of the week based on a number of hotspots in the second set of days of the week;
    - identifying, based on the outbound data, one or more quiet hours of the day associated with the one or more active days of the week based on a number of hotspots in the one or more quiet hours of the day;
    - identifying the one or more quiet days of the week and the one or more quiet hours of the day as a warmspot dataset associated with one or more warmspots;
    - utilizing the warmspot dataset to detect anomalous data transfer activity associated with the particular asset, wherein, to detect the anomalous data transfer activity, the one or more hardware processors are configured to compute one or more statistics on the warmspot dataset; and
    - responsive to detecting the anomalous data transfer activity, generating an alert associated with the particular asset.

9. The method of claim 8, further comprising determining the hotspot threshold associated with the particular asset, wherein determining the hotspot threshold comprises:
- aggregating outgoing source bytes from the particular asset at different hours of different days to calculate outgoing source byte totals for individual hours of individual days;
- calculating logarithmic values associated with the individual outgoing source byte totals;
- sorting the individual hours of the individual days into a table of rows, in descending order according to the calculated logarithmic values,
- computing, for each individual row in the table, median values based on the calculated logarithmic values for a particular individual row and each higher row in the table;
- calculating, for each individual row in the table, derivative values based on a difference between the computed median value associated with the particular individual row and the computed median value associated with a next higher row in the table;
- identifying all local maxima in the derivative values;
- filtering the local maxima that exceed a derivative value threshold; and
- identifying the hotspot threshold associated with the particular asset as a particular local maximum having the largest calculated logarithmic value.

10. The method of claim 9, wherein the hotspots for the particular asset correspond to all hours having calculated logarithmic values that exceed the hotspot threshold.

11. The method of claim 9, wherein determining the hotspot threshold further comprises:
- retrieving an asset identifier associated with the particular asset; and
- utilizing the asset identifier to analyze network activity data of the organization in order to calculate the outgoing source bytes.

12. The method of claim 8, wherein computing the one or more statistics on the warmspot dataset comprises:
- calculating, for the one or more warmspots, the one or more statistics, wherein the calculated statistics include at least a median value and an interquartile range (IQR) value that are utilized to define a baseline value; and identifying an outbound data transfer value from the particular asset exceeding the baseline value as an anomalous data transfer event.

13. The method of claim 12, wherein the baseline value corresponds to a sum of the median value and twice the IQR value.

14. The method of claim 8, wherein generating the alert associated with the particular asset comprises presenting information associated with the anomalous data transfer activity via a user interface component.

15. One or more non-transitory computer-accessible storage media storing program instructions that, when executed on or across one or more processors, implement at least a portion of a system that implements anomalous data transfer detection and cause the system to:

determine hotspots for a particular asset of an organization, wherein the hotspots correspond to one or more periods of time in which outbound data from the particular asset satisfies a hotspot threshold determined to be indicative of high outbound data traffic activity for the particular asset;

identify, based on the outbound data, a first set of days of the week as one or more quiet days of the week based on a number of hotspots in the first set of days of the week;

identify, based on the outbound data, a second set of days of the week as one or more active days of the week based on a number of hotspots in the second set of days of the week;

identify, based on the outbound data, one or more quiet hours of the day associated with the one or more active days of the week based on a number of hotspots in the one or more quiet hours of the day;

identify the one or more quiet days of the week and the one or more quiet hours of the day as a warmspot dataset associated with one or more warmspots;

utilize the warmspot dataset to detect anomalous data transfer activity associated with the particular asset, wherein, to detect the anomalous data transfer activity, the one or more hardware processors are configured to compute one or more statistics on the warmspot dataset; and responsive to detecting the anomalous data transfer activity, generate an alert associated with the particular asset.

16. The one or more non-transitory computer-accessible storage media of claim 15, wherein the program instructions when executed on or across the one or more processors cause the system to:

determine the hotspot threshold associated with the particular asset, wherein, to determine the hotspot threshold, the one or more hardware processors are configured to:

aggregate outgoing source bytes from the particular asset at different hours of different days to calculate outgoing source byte totals for individual hours of individual days;

calculate logarithmic values associated with the individual outgoing source byte totals;

sort the individual hours of the individual days into a table of rows, in descending order according to the calculated logarithmic values, compute, for each individual row in the table, median values based on the calculated logarithmic values for a particular individual row and each higher row in the table;

calculate, for each individual row in the table, derivative values based on a difference between the computed median value associated with the particular individual row and the computed median value associated with a next higher row in the table;

identify all local maxima in the derivative values;

filter the local maxima that exceed a derivative value threshold; and identify the hotspot threshold associated with the particular asset as a particular local maximum having the largest calculated logarithmic value, wherein the hotspots for the particular asset correspond to all hours having calculated logarithmic values that exceed the hotspot threshold.

17. The one or more non-transitory computer-accessible storage media of claim 16, wherein, to determine the hotspot threshold, the one or more hardware processors are further configured to:

retrieve an asset identifier associated with the particular asset; and utilize the asset identifier to analyze network activity data of the organization in order to calculate the outgoing source bytes.

18. The one or more non-transitory computer-accessible storage media of claim 15, wherein to compute the one or more statistics on the warmspot dataset, the one or more hardware processors are further configured to:

calculate, for the one or more warmspots, the one or more statistics, wherein the calculated statistics include at least a median value and an interquartile range (IQR) value that are utilized to define a baseline value; and identify an outbound data transfer value from the particular asset exceeding the baseline value as an anomalous data transfer event.

19. The one or more non-transitory computer-accessible storage media of claim 18, wherein the baseline value corresponds to a sum of the median value and twice the IQR value.

20. The one or more non-transitory computer-accessible storage media of claim 15, wherein, to generate the alert associated with the particular asset, the program instructions when executed on or across the one or more processors cause the system to:

present information associated with the anomalous data transfer activity via a user interface component.

* * * * *